(12) United States Patent
Togashi

(10) Patent No.: US 8,488,296 B2
(45) Date of Patent: Jul. 16, 2013

(54) MULTILAYER CAPACITOR

(75) Inventor: Masaaki Togashi, Tokyo (JP)

(73) Assignee: TDK Corporation, Tokyo (JP)

( * ) Notice: Subject to any disclaimer, the term of this patent is extended or adjusted under 35 U.S.C. 154(b) by 87 days.

(21) Appl. No.: 13/314,708

(22) Filed: Dec. 8, 2011

(65) Prior Publication Data

US 2012/0162853 A1 Jun. 28, 2012

(30) Foreign Application Priority Data

Dec. 24, 2010 (JP) ................................. 2010-288422

(51) Int. Cl.
*H01G 4/228* (2006.01)
(52) U.S. Cl.
USPC ............... 361/306.3; 361/306.1; 361/321.1; 361/321.2; 361/301.4; 361/301.2
(58) Field of Classification Search
USPC .......... 361/306.3, 306.1, 301.4, 321.1, 321.2, 361/311–313, 308.1
See application file for complete search history.

(56) References Cited

U.S. PATENT DOCUMENTS

| | | | |
|---|---|---|---|
| 6,452,781 B1 * | 9/2002 | Ahiko et al. ............... | 361/321.2 |
| 6,819,543 B2 * | 11/2004 | Vieweg et al. ............. | 361/306.3 |
| 6,999,302 B2 * | 2/2006 | Ito et al. ..................... | 361/321.2 |
| 7,433,172 B2 | 10/2008 | Togashi | |
| 7,821,770 B2 * | 10/2010 | Nishikawa et al. ........ | 361/321.2 |
| 7,859,821 B2 * | 12/2010 | Shimizu .................... | 361/306.3 |
| 8,056,199 B2 | 11/2011 | Aoki et al. | |
| 8,107,214 B2 * | 1/2012 | Aoki ........................... | 361/303 |

FOREIGN PATENT DOCUMENTS

| | | |
|---|---|---|
| JP | A-2-156618 | 6/1990 |
| JP | A-2003-168620 | 6/2003 |
| JP | A-2006-253419 | 9/2006 |
| JP | A-2010-80615 | 4/2010 |
| JP | A-2010-103176 | 5/2010 |

* cited by examiner

Primary Examiner — Nguyen T Ha
(74) Attorney, Agent, or Firm — Oliff & Berridge, PLC

(57) ABSTRACT

A multilayer capacitor which can control ESR in a wide frequency band is provided. In a multilayer capacitor 1, inner electrodes 8a, 8b oppose each other as different polarities through a dielectric layer 7 in a capacitance unit 10, inner electrodes 8c to 8f oppose each other as different polarities through dielectric layers 7 in ESR control units 11A, 11B, and the inner electrodes 8a, 8b of the capacitance unit 10 connected to the outer electrodes 3, 4 and the inner electrodes 8c, 8f of the ESR control units 11A, 11B connected to the outer electrodes 3, 4 are kept from opposing each other as different polarities through the dielectric layer 7 at boundaries between the capacitance unit 10 and the ESR control units 11A, 11B.

23 Claims, 17 Drawing Sheets

Fig.5
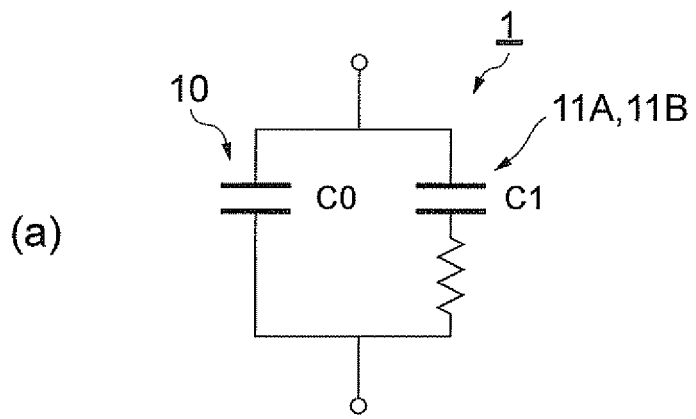
(a)
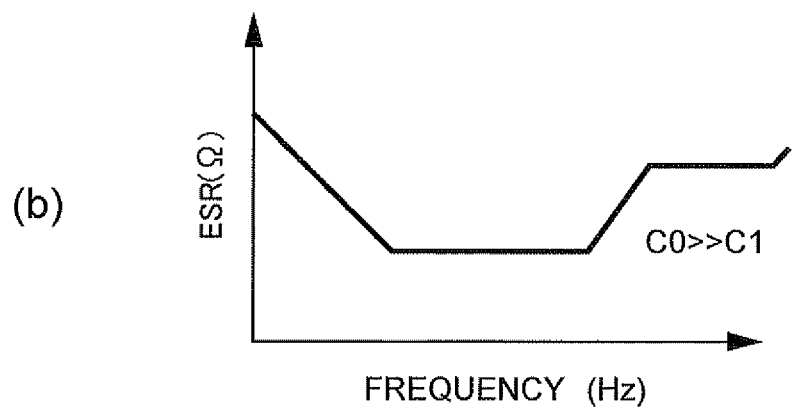
(b)
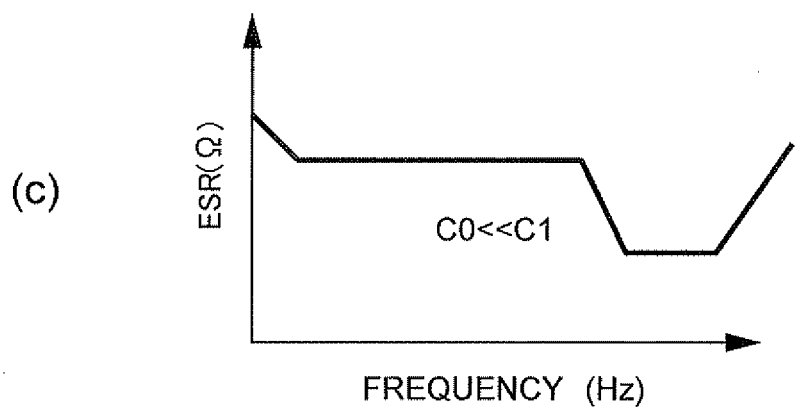
(c)

Fig.10
(a) 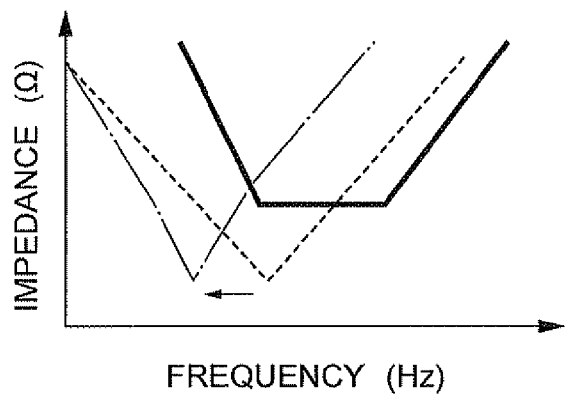
(b) 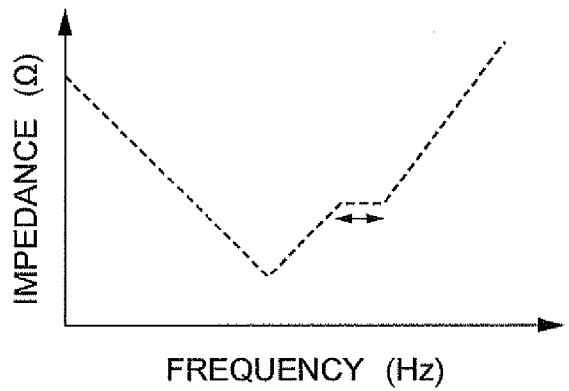
(c) 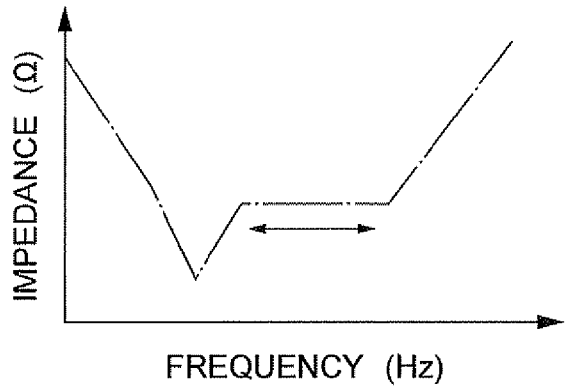

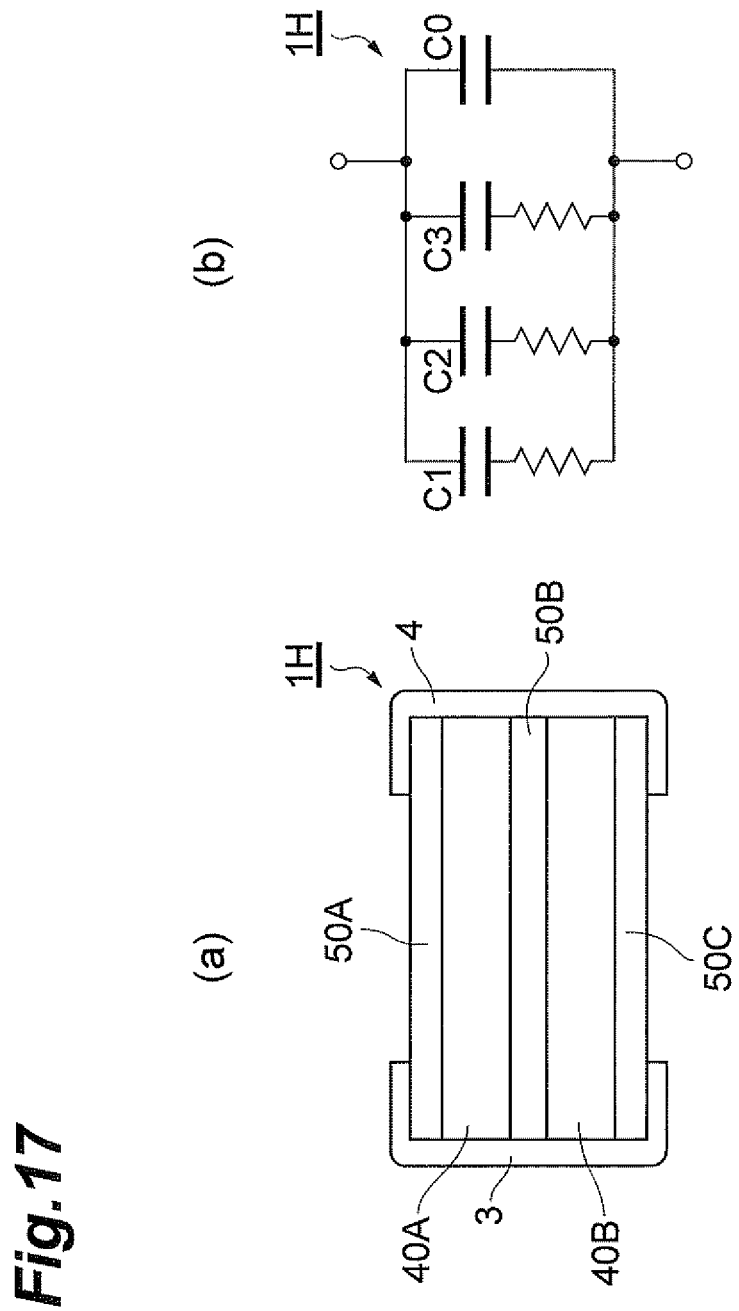

MULTILAYER CAPACITOR

BACKGROUND OF THE INVENTION

1. Field of the Invention

The present invention relates to a multilayer capacitor.

2. Related Background Art

There has conventionally been known a multilayer capacitor comprising a multilayer body formed by alternately stacking dielectric layers and inner electrodes, and outer electrodes and connecting conductors which are electrically insulated from each other on side faces of the multilayer body. For example, the multilayer capacitor disclosed in Japanese Unexamined Patent Application Publication No. 2003-168620 is provided with three kinds of inner electrodes, among which the first inner electrode is connected to one outer electrode and connecting conductors, while the second inner electrode is connected to the other outer electrode. The third inner electrode is connected to the connecting conductors. Such a multilayer is employed for various purposes by increasing ESR.

SUMMARY OF THE INVENTION

A multilayer capacitor as described in Reference above is employed, for example, as a decoupling capacitor in the IC. Such a multilayer capacitor has been desired to achieve a control of the ESR in a wide frequency band.

The present invention is for resolving the problem to be solved above and aims to provide a multilayer capacitor which can control the ESR in a wide frequency band.

In order to resolve the problem to be solved above, the multilayer capacitor in accordance with one aspect of the present invention comprises a multilayer body including a plurality of inner electrodes stacked while interposing a dielectric layer therebetween; first and second outer electrodes formed on an outer surface of the multilayer body; and a first connecting conductor formed on the outer surface of the multilayer body; wherein the plurality of inner electrodes include first to fifth inner electrodes; wherein the multilayer body has a capacitance unit having the first and second inner electrodes connected to the first and second outer electrodes, respectively, the first and second inner electrodes opposing each other as different polarities through the dielectric layer, and an ESR control unit having the third inner electrode connected to at least the first outer electrode, the fourth inner electrode connected to at least the second outer electrode and first connecting conductor, and the fifth inner electrode connected to at least the first connecting conductor, at least two of the third to fifth inner electrodes opposing each other as different polarities through the dielectric layer; and wherein the first or second inner electrode of the capacitance unit and the third or fourth inner electrode of the ESR control unit are kept from opposing each other as different polarities through the dielectric layer at a boundary between the capacitance unit and the ESR control unit.

In this multilayer capacitor, the inner electrode of the capacitance unit connected to the outer electrode and the inner electrode of the ESR control unit connected to the outer electrode are kept from opposing each other as different polarities through the dielectric layer at the boundary between the capacitance unit and the ESR control unit. As a consequence, no high frequency currents pass through the boundary between the capacitance unit and the ESR control unit, so that the capacitor components of the capacitance unit and ESR control unit can be separated from each other without being combined, and so can their ESR components. Since the ESR component (lower ESR) in the capacitance unit and the ESR component (higher ESR) in the ESR control unit are thus separated from each other, the ESR on the higher or lower frequency band side can be increased. Hence, the ESR can be controlled in a wide frequency band.

Preferably, in the ESR control unit, the third and fourth inner electrodes are kept from opposing each other as different polarities through the dielectric layer. Such a structure can further inhibit high frequency currents from passing through the boundary between the capacitance unit and ESR control unit, whereby the capacitor components and ESR components can be separated more favorably.

The multilayer capacitor may further comprise a second connecting conductor formed on the outer surface of the multilayer body, while the third inner electrode is connected to the first outer electrode and the second connecting conductor. The plurality of inner electrodes may further include a sixth inner electrode, the ESR control unit may have the sixth inner electrode connected to the second connecting conductor, the fifth inner electrode may be connected to the first connecting conductor, the first and third inner electrodes may have a first polarity, and the second and fourth inner electrodes may have a second polarity.

Preferably, at the boundary between the capacitance unit and the ESR control unit, the first and fourth inner electrodes are kept from opposing each other through the dielectric layer, the first inner electrode and one of the third, fifth, and sixth inner electrodes oppose each other through the dielectric layer, the second and third inner electrodes are kept from opposing each other through the dielectric layer, and the second inner electrode and one of the fourth to sixth inner electrodes oppose each other through the dielectric layer. In such a structure, at the boundary between the capacitance unit and the ESR control unit, the inner electrode of the capacitance unit connected to the outer electrode and the inner electrode of the ESR unit connected to the outer electrode are kept from opposing each other as different polarities through the dielectric layer. Therefore, the capacitor components and ESR components of the capacitance unit and the ESR control unit can be separated more favorably.

Preferably, in the ESR control unit, the third and fourth inner electrodes are kept from opposing each other through the dielectric layer, the fourth inner electrode and the fifth or sixth inner electrode oppose each other through the dielectric layer, the third inner electrode and the fifth or sixth inner electrode oppose each other through the dielectric layer, and the fifth and sixth inner electrodes oppose each other through the dielectric layer. Such a structure can further inhibit high frequency currents from passing through the boundary between the capacitance unit and ESR control unit, whereby the capacitor components and ESR components can be separated more reliably.

Preferably, in the ESR control unit, the fourth and sixth inner electrodes are kept from opposing each other through the dielectric layer, the fourth and fifth inner electrodes oppose each other through the dielectric layer, the third and fourth inner electrodes are kept from opposing each other through the dielectric layer, and the third and sixth inner electrodes oppose each other through the dielectric layer. In such a structure, the inner electrodes connected to the outer electrode and connecting conductor are kept from opposing each other, so that high frequency currents can further be inhibited from passing through the boundary between the capacitance unit and ESR control unit, whereby the capacitor components and ESR components can be separated more reliably.

Preferably, at the boundary between the capacitance unit and the ESR control unit, the first and sixth inner electrodes oppose each other through the dielectric layer, while the second and fifth inner electrodes oppose each other through the dielectric layer. In such a structure, the inner electrodes opposing each other at the boundary between the capacitance unit and the ESR control unit have polarities different from each other, whereby the capacitance of the multilayer capacitor can be enhanced.

The multilayer capacitor may further comprise the second connecting conductor formed on the outer surface of the multilayer body, the fourth inner electrode may be connected to the second outer electrode and the first and second connecting conductors, and the fifth inner electrode may be connected to the first and second connecting conductors.

Preferably, in the ESR control unit, the third and fourth inner electrodes are kept from opposing each other through the dielectric layer, the fourth and fifth inner electrodes oppose each other through the dielectric layer, and the third and fifth inner electrodes oppose each other through the dielectric layer. In such a structure, the inner electrodes connected to the outer electrode and connecting conductor are kept from opposing each other, so that high frequency currents can further be inhibited from passing through the boundary between the capacitance unit and ESR control unit, whereby the capacitor components and ESR components can be separated more reliably.

Preferably, in the multilayer body, the capacitance unit and the ESR control unit are arranged alternately in the stacking direction of the dielectric layer. In such a structure, the multilayer capacitor does not have a mounting direction fixed to one direction and thus can be mounted efficiently to a mounting substrate, whereby its workability can be improved.

Preferably, in the multilayer body, the ESR control unit is arranged at an outermost part in the stacking direction. This can lower ESL (equivalent series inductance).

Preferably, in the ESR control unit, the third or fourth inner electrode is arranged at an outermost part in the stacking direction. This can further lower the ESL.

Preferably, the ESR control unit has a capacitance lower than that of the capacitance unit. This can raise the ESR in a high frequency band.

Preferably, the ESR control unit has a capacitance higher than that of the capacitance unit. This can raise the ESR in a low frequency band.

Preferably, the capacitance unit and the ESR control unit have a gap therebetween greater than that between the inner electrodes in the capacitance unit or ESR control unit. Such a structure can further separate two capacitor components of the capacitance unit and ESR control unit.

Preferably, the first and second inner electrodes have a winding form, while a current flows therethrough in the same direction. This allows currents to flow in a more uniform direction through the first and second inner electrodes in the capacitance unit and thus can increase the ESL in the capacitance unit.

Preferably, a plurality of the first and second connecting conductors are formed so as to be separated from each other in the stacking direction at a position corresponding to a lead conductor of the inner electrode. Such a structure can separate capacitor components of ESR control units arranged so as to hold the capacitance unit therebetween, for example.

The multilayer capacitor in accordance with another aspect of the present invention comprises a multilayer body including a plurality of inner electrodes stacked while interposing a dielectric layer therebetween; first and second outer electrodes formed on an outer surface of the multilayer body; and a first connecting conductor formed on the outer surface of the multilayer body; wherein the plurality of inner electrodes include first to fifth inner electrodes; wherein the multilayer body has a capacitance unit having the first and second inner electrodes connected to the first and second outer electrodes, respectively, the first and second inner electrodes opposing each other as different polarities through the dielectric layer, and an ESR control unit having the third inner electrode connected to at least the first outer electrode, the fourth inner electrode connected to at least the second outer electrode and first connecting conductor, and the fifth inner electrode connected to at least the first connecting conductor, at least two of the third to fifth inner electrodes opposing each other as different polarities through the dielectric layer; wherein, at a boundary between the capacitance unit and the ESR control unit, the first or second inner electrode of the capacitance unit and the third or fourth inner electrode of the ESR control unit oppose each other as the same polarity through the dielectric layer, or the first or second inner electrode of the capacitance unit and the fifth inner electrode of the ESR control unit oppose each other through the dielectric layer.

Preferably, at the boundary between the capacitance unit and the ESR control unit, the second inner electrode of the capacitance unit and the fifth inner electrode of the ESR control unit oppose each other through the dielectric layer.

Preferably, in the ESR control unit, the third and fifth inner electrodes oppose each other as different polarities through the dielectric layer, or the fourth and fifth inner electrodes oppose each other as the same polarity through the dielectric layer.

The multilayer capacitor may further comprise a second connecting conductor formed on the outer surface of the multilayer body, while the third inner electrode may be connected to the first outer electrode and second connecting conductor. Alternatively, the multilayer capacitor may further comprise a second connecting conductor formed on the outer surface of the multilayer body, the fourth inner electrode may be connected to the second outer electrode and first and second connecting conductors, and the fifth inner electrode is connected to the first and second connecting conductors.

The present invention can control the ESR in a wide frequency band.

BRIEF DESCRIPTION OF THE DRAWINGS

FIG. 5 is a chart illustrating the circuit and ESR characteristics of the multilayer capacitor;

FIG. 10 is a chart illustrating impedance characteristics of the multilayer capacitor represented in FIG. 9;

FIG. 17 is a diagram illustrating the circuit of the multilayer capacitor represented in FIG. 16.

DESCRIPTION OF THE PREFERRED EMBODIMENTS

First Embodiment

Figure 1:
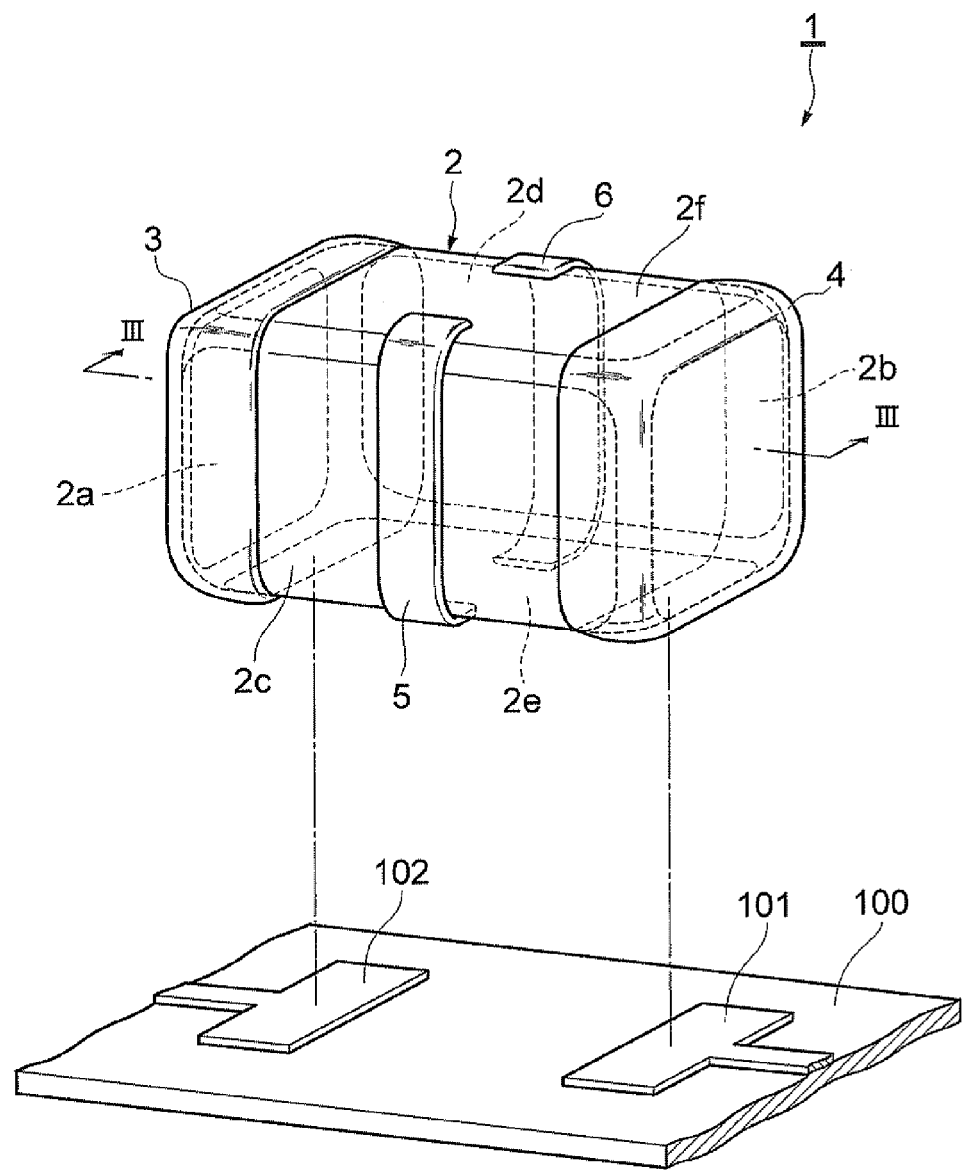
FIG. 1 is a perspective view illustrating the multilayer capacitor in accordance with a first embodiment.
Figure 2:
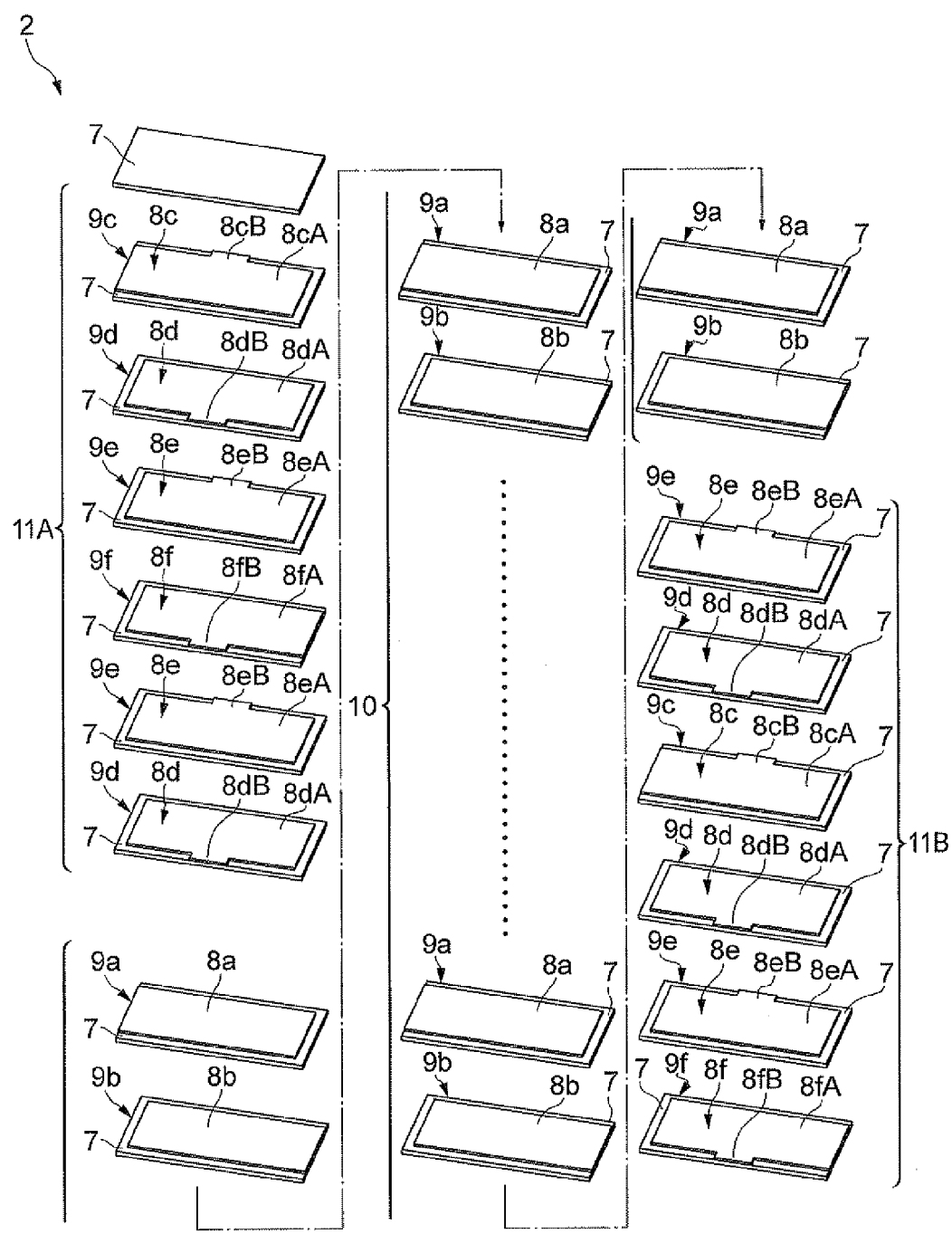
FIG. 2 is a view illustrating the layer structure of the multilayer capacitor represented in FIG. 1.
Figure 3:
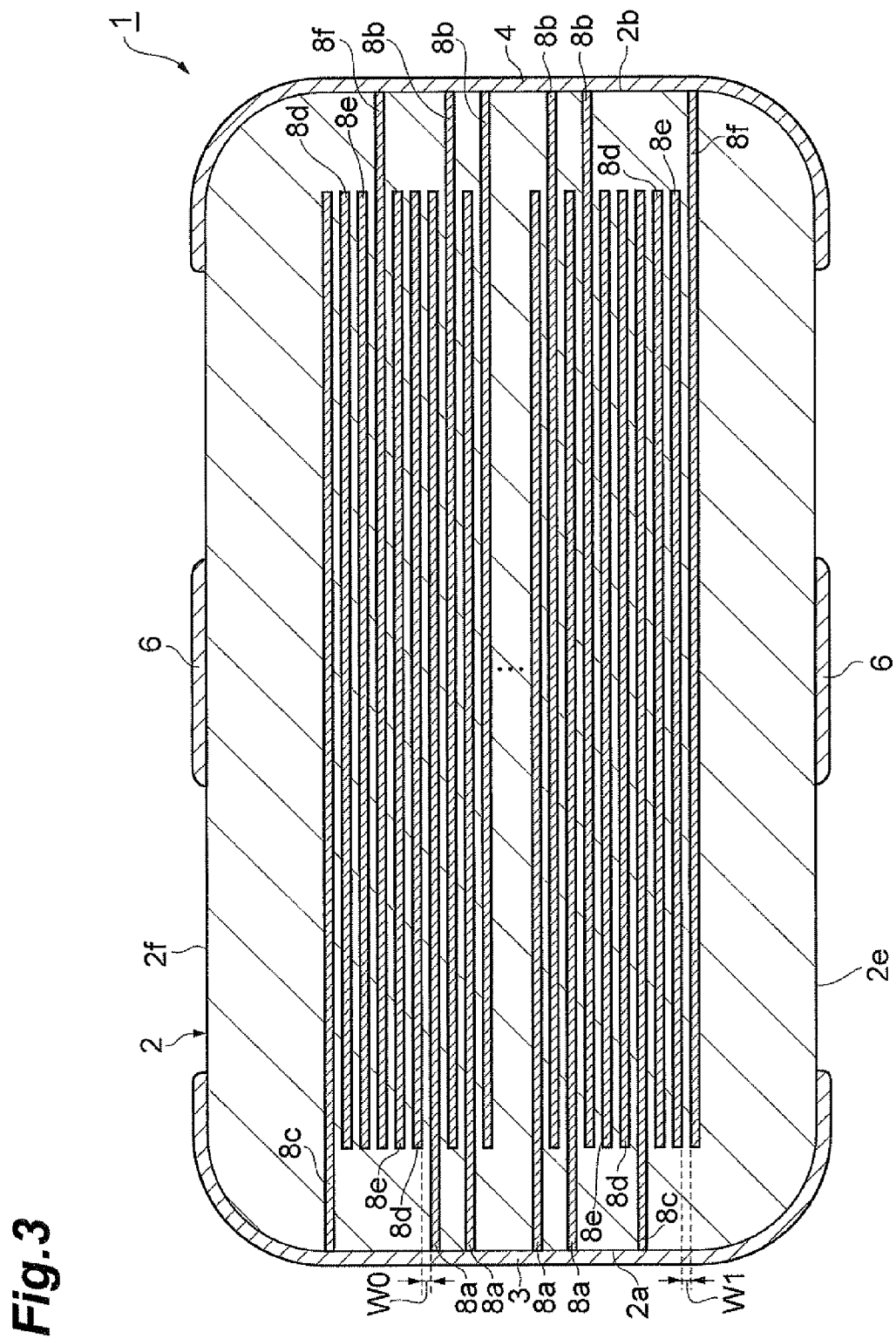
FIG. 3 is a sectional view of the multilayer capacitor taken along the line III-III of FIG. 1.

FIG. 1 is a perspective view illustrating the multilayer capacitor in accordance with the first embodiment. FIG. 2 is a view illustrating the layer structure of the multilayer capacitor represented in FIG. 1, while FIG. 3 is a sectional view of the multilayer capacitor taken along the line III-III of FIG. 1.

As illustrated in FIG. 1, this multilayer capacitor 1 comprises a substantially rectangular parallelepiped multilayer body 2, outer electrodes 3, 4, and connecting conductors 5, 6.

The multilayer body 2 has a pair of end faces (outer surfaces) 2a, 2b; a pair of side faces (outer surfaces) 2c, 2d extending so as to connect the pair of end faces 2a, 2b to each other and opposing each other; and a pair of main faces 2e, 2f extending so as to connect the pair of side faces 2c, 2d to each other and opposing each other. As illustrated in FIG. 2, the multilayer body 2 is constructed by a plurality of composite layers 9a to 9f having different patterns of inner electrodes 8a to 8f formed on their corresponding dielectric layers 7 and a dielectric layer 7 mounted on the uppermost layer of the composite layers 9a to 9f so as to function as a protective layer. Each dielectric layer 7 is constituted by a sintered body of a ceramic green sheet containing a dielectric ceramic, while each of the inner electrodes 8a to 8f is made of a sintered body of a conductive paste. The dielectric layers 7 are integrated to such an extent that their boundaries are visually indiscernible in the multilayer capacitor 1 in practice.

The outer electrodes 3, 4 and connecting conductors 5, 6 are formed by burning a conductive paste containing a conductive metal powder and a glass frit. The outer electrodes 3, 4 are electrodes which attain predetermined polarities when mounting the multilayer capacitor 1. The connecting conductors 5, 6 are conductors for connecting inner electrodes 8 belonging to ESR control units 11A, 11B, which will be explained later, in the multilayer body 2 in parallel to each other without being directly connected to mounting substrates.

The outer electrode (first outer electrode) 3, which is an electrode connected with negative polarity (first polarity), for example, when mounting the multilayer capacitor 1 to a substrate, is formed so as to cover one end face 2a in the longitudinal direction of the multilayer body 2. The outer electrode (second outer electrode) 4, which is an electrode connected with positive polarity (second polarity), for example, when mounting the multilayer capacitor 1 to a substrate, is formed so as to cover the other end face 2b in the longitudinal direction of the multilayer body 2.

The connecting conductor 5 is formed on one side face 2c along the stacking direction in the side faces 2c, 2d orthogonal to the end faces 2a, 2b of the multilayer body 2, while the connecting conductor 6 is formed on the other side face 2d opposing the side face 2c. The connecting conductors 5, 6 extend like bands in the stacking direction on the side faces 2c, 2d and have pad parts protruding onto the main faces 2e, 2f of the multilayer body 2. The outer electrodes 3, 4 and connecting conductors 5, 6 are separated from each other with predetermined gaps therebetween and electrically insulated from each other.

A substrate 100 used for mounting the multilayer capacitor 1 has an anode land pattern 101 and a cathode land pattern 102. The anode and cathode land patterns 101, 102 are formed like bands along the width direction of the outer electrodes 3, 4, for example, and connected to predetermined circuit leads.

In the mounting structure of the multilayer capacitor 1, the outer electrodes 3, 4 are connected to the cathode and anode land patterns 102, 101, respectively. The connecting conductors 5, 6 are connected to none of the anode and cathode land patterns 101, 102. That is, in the mounting structure of the multilayer capacitor 1, only the outer electrodes 3, 4 are connected to the substrate 100.

The structure of the multilayer body 2 will now be explained in further detail.

As illustrated in FIGS. 2 and 3, the multilayer body 2 has a capacitance part 10 mainly contributing to the capacitance of the multilayer capacitor and the ESR control units 11A, 11B for controlling the ESR (equivalent series resistance) of the multilayer capacitor 1. In the multilayer body 2, the ESR control units 11A, 11B are arranged so as to hold the capacitance unit 10 therebetween when seen in the stacking direction (the depicted vertical direction). That is, the multilayer body 2 is constructed by arranging the ESR control unit 11A, capacitance unit 10, and ESR control unit 11B in this order.

The capacitance unit 10 is constructed by alternately stacking a plurality of two kinds of composite layers 9a, 9b having respective inner electrodes. Each composite layer 9a has the inner electrode (first inner electrode) 8a formed on the dielectric layer 7. The inner electrode 8a has a rectangular form, while one end part thereof is exposed at the end face 2a of the multilayer body 2, so as to connect with the outer electrode 3. The inner electrode 8a attains negative polarity.

Each composite layer 9b has the inner electrode (second inner electrode) 8b formed on the dielectric layer 7. The inner electrode 8b has a rectangular form, while one end part thereof is exposed at the end face 2b of the multilayer body 2, so as to connect with the outer electrode 4. The inner electrode 8b attains positive polarity. In the capacitance unit 10, each pair of the inner electrodes 8a, 8b oppose each other as different polarities through their corresponding dielectric layer 7. The number of stacked composite layers 9a, 9b, which are depicted only four each in FIG. 2, is set appropriately in conformity to the design of the capacitor.

Each of the ESR control units 11A, 11B is constructed by four kinds of composite layers 9c to 9f. Each composite layer 9c has an inner electrode (third inner electrode) 8c formed on the dielectric layer 7. The inner electrode 8c has a rectangular main electrode part 8cA formed at a center portion and a band-shaped lead conductor 8cB drawn from a side of the main electrode part 8cA. An end portion of the main electrode part 8cA is exposed at the end face 2a of the multilayer body 2, so as to connect with the outer electrode 3. An end portion of the lead conductor 8cB is exposed at the side face 2d of the multilayer body 2, so as to connect with the connecting conductor 6. The inner electrode 8c attains negative polarity.

Each composite layer 9d has an inner electrode (sixth inner electrode) 8d formed on the dielectric layer 7. The inner electrode 8d has a rectangular main electrode part 8dA formed at a center portion and a band-shaped lead conductor 8dB drawn from a side of the main electrode part 8dA. An end portion of the lead conductor 8dB is exposed at the side face 2c of the multilayer body 2 in the direction opposite to the lead conductor 8cB, so as to connect with the connecting conductor 5.

Each composite layer 9e has an inner electrode (fifth inner electrode) 8e formed on the dielectric layer 7. The inner electrode 8e has a rectangular main electrode part 8eA formed at a center portion and a band-shaped lead conductor 8eB drawn from a side of the main electrode part 8eA. An end portion of the lead conductor 8eB is exposed at the side face 2d of the multilayer body 2, so as to connect with the connecting conductor 6.

Each composite layer 9f has an inner electrode (fourth inner electrode) 8f formed on the dielectric layer 7. The inner electrode 8f has a rectangular main electrode part 8fA formed at a center portion and a band-shaped lead conductor 8fB drawn from a side of the main electrode part 8fA. An end portion of the main electrode part 8fA is exposed at the end face 2b of the multilayer body 2 in the direction opposite to that in the inner electrode 8c, so as to connect with the outer electrode 4. An end portion of the lead conductor 8fB is exposed at the side face 2c of the multilayer body 2, so as to connect with the connecting conductor 5. The inner electrode 8f attains positive polarity.

In the ESR control unit 11A, the composite layer 9c formed with the inner electrode 8c, the composite layer 9d formed with the inner electrode 8d, the composite layer 9e formed with the inner electrode 8e, the composite layer 9f formed with the inner electrode 8f, the composite layer 9e formed with the inner electrode 8e, and the composite layer 9d formed with the inner electrode 8d are stacked in this order. The inner electrode 8e of the composite layer 9e is connected to the outer electrode 3 through the connecting conductor 6 and inner electrode 8c, so as to attain negative polarity as with the inner electrode 8c. The inner electrode 8d of the composite layer 9d is connected to the outer electrode 4 through the connecting conductor 5 and inner electrode 8f, so as to attain positive polarity as with the inner electrode 8f. That is, the inner electrodes 8e, 8e opposing the inner electrodes 8d, 8f through their corresponding dielectric layers 7 attain a polarity different from that of the latter inner electrodes. The inner electrode 8e is arranged at the uppermost part (outermost part) of the ESR control unit 11A.

In the ESR control unit 11B, the composite layer 9e formed with the inner electrode 8e, the composite layer 9d formed with the inner electrode 8d, the composite layer 9c formed with the inner electrode 8c, the composite layer 9d formed with the inner electrode 8d, the composite layer 9e formed with the inner electrode 8e, and the composite layer 9f formed with the inner electrode 8f are stacked in this order. The inner electrode 8e in the composite layer 9e is connected to the outer electrode 3 through the connecting conductor 6 and inner electrode 8c, so as to attain negative polarity as with the inner electrode 8c. The inner electrode 8d in the composite layer 9d is connected to the outer electrode 4 through the connecting conductor 5 and inner electrode 8f, so as to attain positive polarity as with the inner electrode 8f. That is, the inner electrodes 8c, 8e opposing the inner electrodes 8d, 8f through their corresponding dielectric layers 7 attain a polarity different from that of the latter inner electrodes. The inner electrode 8f is arranged at the lowermost part (outermost part) of the ESR control unit 11B.

The ESR control units 11A, 11B are constructed such that the inner electrodes 8c, 8f are kept from opposing each other through the dielectric layer 7. That is, in the ESR control units 11A, 11B, the inner electrodes 8c, 8f having the main electrode parts 8cA, 8fA connected to the outer electrodes 3, 4, respectively, are prevented from opposing each other through the dielectric layer 7.

At the boundaries between the capacitance unit 10 and the ESR control units 11A, 11B in the multilayer body 2, the respective inner electrodes 8d, 8e of the composite layers 9d, 9a oppose each other through the dielectric layer 7, and so do the respective inner electrodes 8b, 8e of the composite layers 9b, 9e. Specifically, the inner electrode 8a of the composite layer 9a connected to the outer electrode 3 so as to attain negative polarity and the inner electrode 8d of the composite layer 9d attaining positive polarity through the connecting conductor 5 oppose each other through the dielectric layer 7. The inner electrode 8b of the composite layer 9b connected to the outer electrode 4 so as to attain positive polarity and the inner electrode 8e of the composite layer 9e attaining negative polarity through the connecting conductor 6 also oppose each other through the dielectric layer 7.

That is, the multilayer body 2 is constructed such that, at the boundaries between the capacitance unit 10 and the ESR control units 11A, 11B, the inner electrodes 8a, 8c connected to the outer electrode 3 and the inner electrodes 8b, 8f connected to the outer electrode 4 are kept from being arranged such as to have polarities different from each other through the dielectric layer 7. Specifically, at the boundaries between the capacitance unit 10 and the ESR control units 11A, 11B in the multilayer body 2, the inner electrodes 8a, 8f are kept from opposing each other, and so are the inner electrodes 8b, 8c.

In the multilayer body 2, as illustrated in FIGS. 2 and 3, the gap W0 between the capacitance unit 10 and each of the ESR control units 11A, 11B equals the gap W1 between the inner electrodes in each of the ESR control units 11A, 11B.

In thus constructed multilayer capacitor 1, the inner electrodes 8a, 8b oppose the inner electrodes 8d, 8e at the boundaries between the capacitance unit 10 and the ESR control units 11A, 11B, respectively. Hence, the multilayer capacitor 1 is constructed such that, when mounted to the substrate 100 so as to be fed with a current, no high frequency currents pass through the boundaries between the capacitance unit 10 and the ESR control units 11A, 11B, i.e., between the composite layers 9a, 9d and between the composite layers 9b, 9e.

Figure 4:
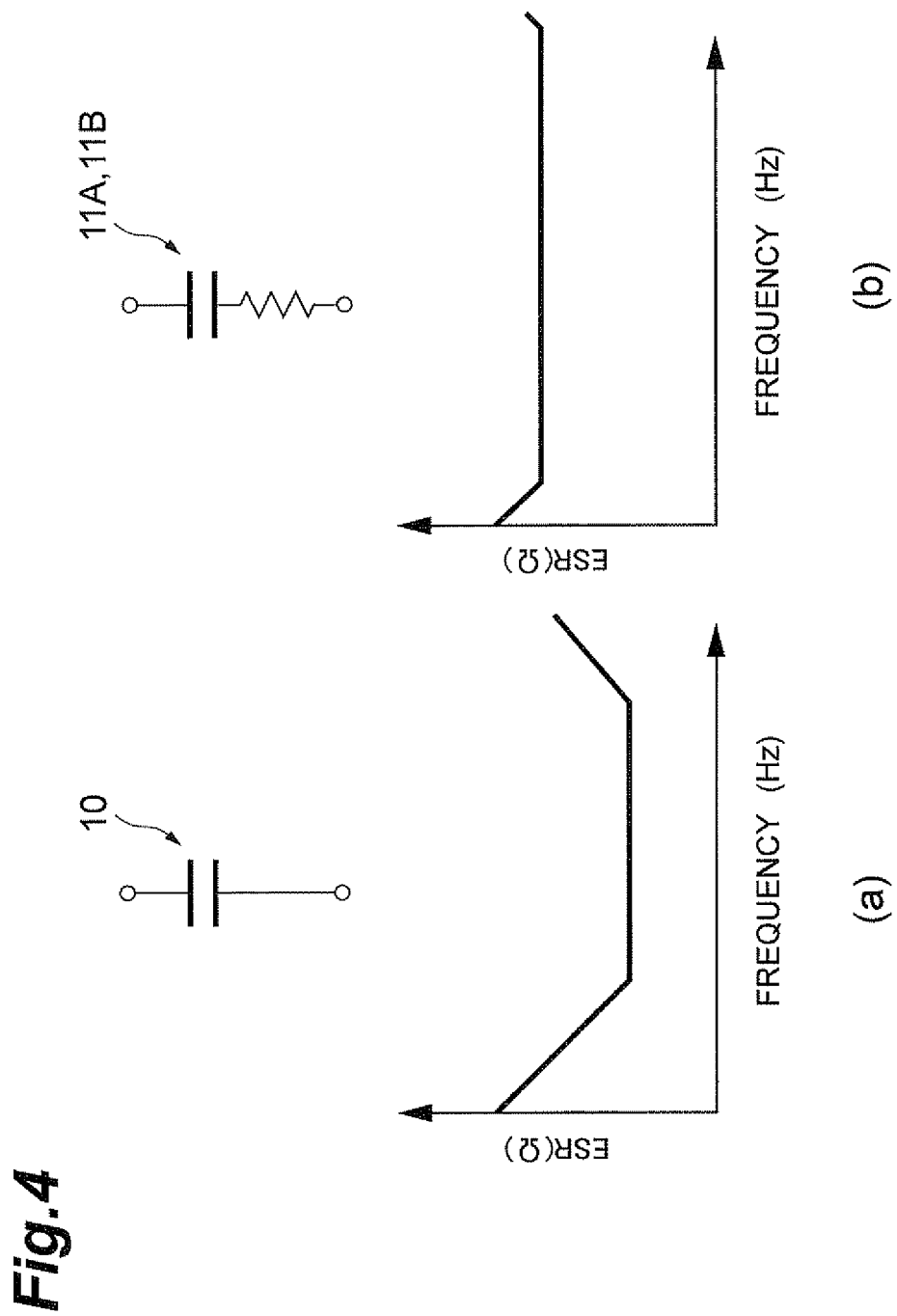
FIG. 4 is a chart illustrating the ESR characteristics of a capacitance unit and ESR control units.

Characteristics of the multilayer capacitor 1 will now be explained. FIG. 4 is a chart illustrating the ESR characteristics of the capacitance unit and ESR control units. FIGS. 4(a) and 4(b) illustrate the ESR characteristics of the capacitance unit 10 and each of the ESR control units 11A, 11B, respectively. The ordinate and abscissa represent ESR [Ω] and frequency [Hz], respectively. As illustrated in FIGS. 4(a) and 4(b), the capacitance unit 10 yields an ESR lower than that of each of the ESR control units 11A, 11B, i.e., each of the ESR control units 11A, 11B has such a characteristic as to exhibit an ESR higher than that of the capacitance unit 10.

FIG. 5 is a chart illustrating the circuit and ESR characteristics of the multilayer capacitor. As illustrated in FIG. 5(a), the multilayer capacitor 1 is constructed as a circuit in which the capacitor components (C0, C1) of the capacitance unit 10 and ESR control units 11A, 11B are separated from each other. The multilayer capacitor 1 is also constructed so as to separate the ESR components. When the capacitance C0 of the capacitance unit 10 is set sufficiently higher than the capacitance C1 of the ESR control units 11A, 11B (C0>>C1), the multilayer capacitor 1 exhibits lower and higher ESR values in lower and higher frequency bands, respectively, as illustrated in FIG. 5(b). When the capacitance C0 of the capacitance unit 10 is set sufficiently lower than the capacitance C1 of the ESR control units 11A, 11B (C0<<C1), the multilayer capacitor 1 exhibits higher and lower ESR values in lower and higher frequency bands, respectively, as illustrated in FIG. 5(c). The capacitances C0, C1 of the capacitance unit 10 and ESR control units 11A, 11B are set appropriately according to properties of signals (noises) and the like.

In the multilayer capacitor 1, as explained in the foregoing, the inner electrodes 8a, 8b of the capacitance unit 10 connected to the outer electrodes 3, 4 and the inner electrodes 8c, 8f of the ESR control units 11A, 11B connected to the outer electrodes 3, 4 are kept from being arranged such as to have polarities different from each other through the dielectric layer 7 at the boundaries between the capacitance unit 10 and the ESR control units 11A, 11B. As a consequence, no high frequency currents pass through the boundaries between the capacitance unit 10 and the ESR control units 11A, 11B, so that the capacitor components of the capacitance unit 10 and ESR control units 11A, 11B can be separated from each other without being combined, and so can their ESR components. Since the ESR component (lower ESR) in the capacitance unit 10 and the ESR component (higher ESR) in the ESR control units 11A, 11B are thus separated from each other, the ESR on the higher or lower frequency band side can be increased in the multilayer capacitor 1. Hence, the ESR can be controlled in a wide frequency band.

At the boundaries between the capacitance unit 10 and the ESR control units 11A, 11B in the multilayer capacitor 1, the respective inner electrodes 8d, 8e of the composite layers 9d, 9a oppose each other through the dielectric layer 7, and so do the respective inner electrodes 8b, 8e of the composite layers 9b, 9e. Thus, the adjacent inner electrodes attain different polarities, whereby the capacitance can be enhanced.

In the multilayer body 2, the ESR control units 11A, 11B are arranged so as to hold the capacitance unit 10 therebetween in the stacking direction. This eliminates the directivity in mounting the multilayer capacitor 1, so that its electric characteristics do not vary whether it is mounted on the upper or lower side, whereby characteristics can be prevented from fluctuating depending on the mounting direction. Since the ESR control units 11A, 11B are arranged on the upper and lower sides, respectively, while the inner electrodes 8e, 8f connected to the outer electrodes 3, 4 are arranged on the uppermost and lowermost parts, respectively, the ESL (equivalent series inductance) can be lowered.

In the multilayer body 2, the gap W0 between the capacitance unit 10 and each of the ESR control units 11A, 11B may be greater than the gap W1 between the inner electrodes in the capacitance unit 10 and ESR control units 11A, 11B. Such a structure can further separate the capacitor components (C0, C1) of the capacitance unit 10 and ESR control units 11A, 11B and the ESR components in the multilayer capacitor 1.

Second Embodiment

Figure 6:
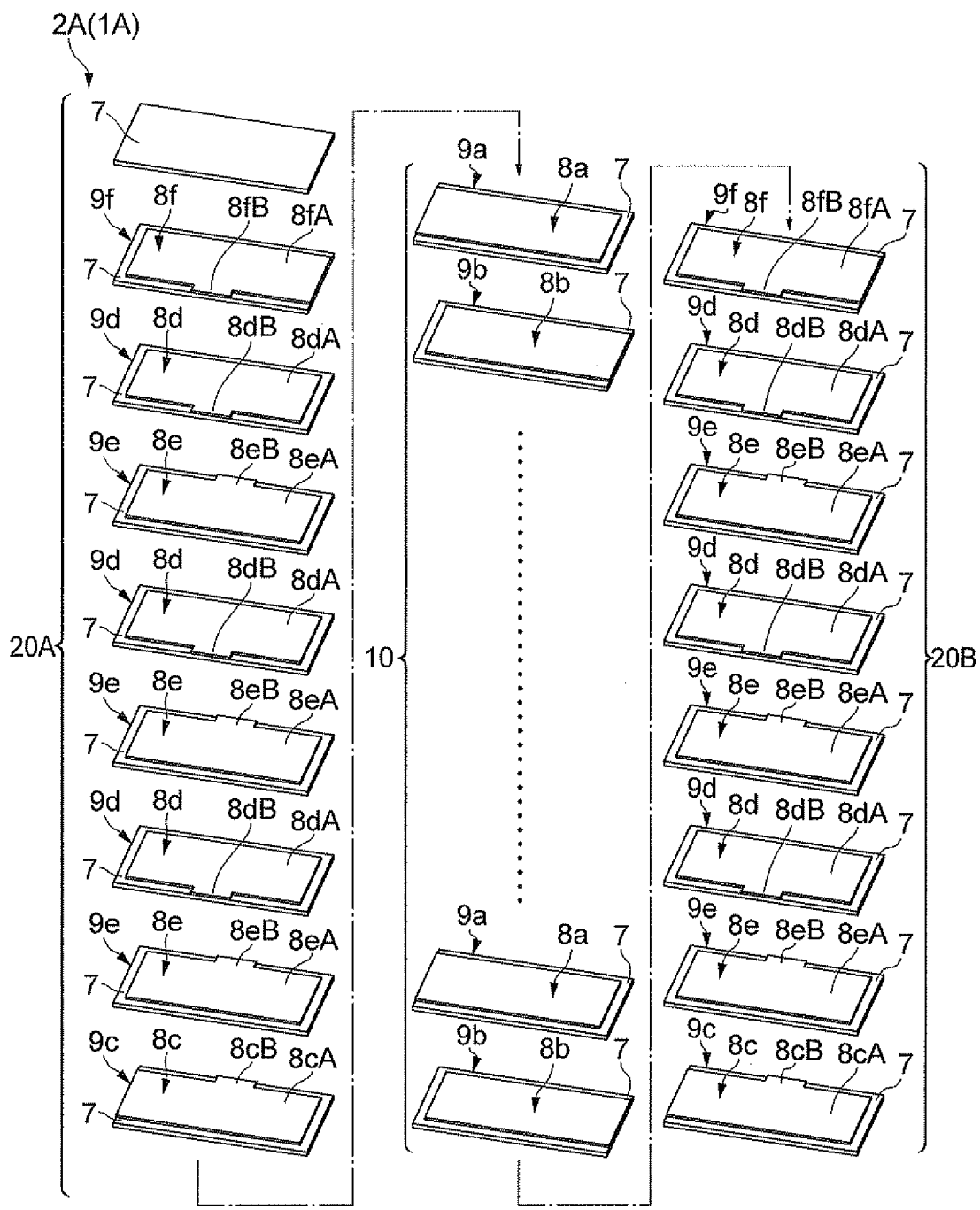
FIG. 6 is a view illustrating the layer structure of the multilayer capacitor in accordance with a second embodiment.

The second embodiment will now be explained. FIG. 6 is a view illustrating the layer structure of the multilayer capacitor in accordance with the second embodiment. As illustrated in FIG. 6, in this multilayer capacitor 1A, the composite layers 9a to 9f have a multilayer structure different from that in the first embodiment, while the outer electrodes 3, 4, connecting conductors 5, 6, and composite layers 9a to 9f are constructed as in the first embodiment.

As illustrated in FIG. 6, in the multilayer body 2A of the multilayer capacitor 1A, ESR control units 20A, 20B are arranged so as to hold a capacitance unit 10 therebetween when seen in the stacking direction. That is, the multilayer body 2A is constructed by arranging the ESR control unit 20A, capacitance unit 10, and ESR control unit 20B in this order. The capacitance unit 10 is constructed by alternately stacking a plurality of composite layers 9a, 9b, while their inner electrodes 8a, 8b oppose each other as different polarities through their corresponding dielectric layer 7. The number of stacked composite layers 9a, 9b, which are depicted only two each in FIG. 6, is set appropriately in conformity to the design.

Each of the ESR control units 20A, 20B is constructed by stacking a composite layer 9f formed with an inner electrode 8f, a composite layer 9d formed with an inner electrode 8d, a composite layer 9e formed with an inner electrode 8e, a composite layer 9d formed with an inner electrode 8d, a composite layer 9e formed with an inner electrode 8e, composite layer 9d formed with an inner electrode 8d, a composite layer 9e formed with an inner electrode 8e, and a composite layer 9c formed with an inner electrode 8c in this order. The inner electrode 8f is arranged at the uppermost part of the ESR control unit 20A, while the inner electrode 8c is arranged at the lowermost part of the ESR control unit 20B.

At the boundaries between the capacitance unit 10 and the ESR control units 20A, 20B, the inner electrodes 8a, 8b connected to the outer electrodes 3, 4 and their corresponding inner electrode 8c, 8f connected to the outer electrodes 3, 4 are kept from being arranged such as to have polarities different from each other through the dielectric layer 7. In other words, in the multilayer body 2A, the inner electrode 8a, 8b connected to the outer electrodes 3, 4 and their corresponding inner electrode 8c, 8f connected to the outer electrodes 3, 4 are arranged such as to have the same polarities through the dielectric layer 7.

Specifically, the inner electrodes 8a, 8c of the composite layers 9a, 9c connected to the outer electrode 3 attain negative polarity and oppose each other through the dielectric layer 7 at the boundary between the capacitance unit 10 and the ESR control unit 20A. The inner electrodes 8b, 8f of the composite layers 9b, 9f connected to the outer electrode 4 attain positive polarity and oppose each other through the dielectric layer 7 at the boundary between the capacitance unit 10 and the ESR control unit 20B.

At the boundaries between the capacitance unit 10 and the ESR control units 20A, 20B in thus constructed multilayer capacitor 1A, the inner electrodes 8a, 8c oppose each other, and so do the inner electrodes 8b, 8f. Hence, the multilayer capacitor 1A is constructed such that, when mounted to the substrate 100 so as to be fed with a current, no high frequency currents pass through the boundaries between the capacitance unit 10 and the ESR control units 20A, 20B, i.e., between the composite layers 9c, 9a and between the composite layers 9b, 9f.

As explained in the foregoing and as in the first embodiment, at the boundaries between the capacitance unit 10 and the ESR control units 20A, 20B in the multilayer capacitor 1A, the inner electrodes 8a, 8b of the capacitor unit 10 connected to the outer electrodes 3, 4 and their corresponding inner electrodes 8c, 8f of the ESR control units 20A, 20B connected to the outer electrodes 3, 4 are kept from being arranged such as to have polarities different from each other through the dielectric layer 7. That is, the inner electrodes 8a, 8c attaining the same polarity (negative polarity) oppose each other through the dielectric layer 7, and so do the inner electrodes 8b, 8f attaining the same polarity (positive polarity).

As a consequence, no high frequency currents pass through the boundaries between the capacitance unit 10 and the ESR control units 20A, 20B, so that the capacitor components of the capacitance unit 10 and ESR control units 20A, 20B can be separated from each other without being combined, and so can their ESR components. Since the ESR component (lower ESR) in the capacitance unit 10 and the ESR component (higher ESR) in the ESR control units 20A, 20B are thus separated from each other, the ESR on the higher or lower frequency band side can be increased in the multilayer capacitor 1A. Hence, the ESR can be controlled in a wide frequency band.

In the ESR control units 20A, 20B of the multilayer body 2, the inner electrodes 8d, 8f of the composite layers 9d, 9f oppose each other, and so do the inner electrodes 8c, 8e of the composite layers 9c, 9e. Thus, the inner electrodes having different polarities connected to their corresponding outer electrode 3, 4 and connecting conductors 5, 6 are kept from being adjacent to each other, whereby high frequency currents can further be inhibited from passing.

Third Embodiment

Figure 7:
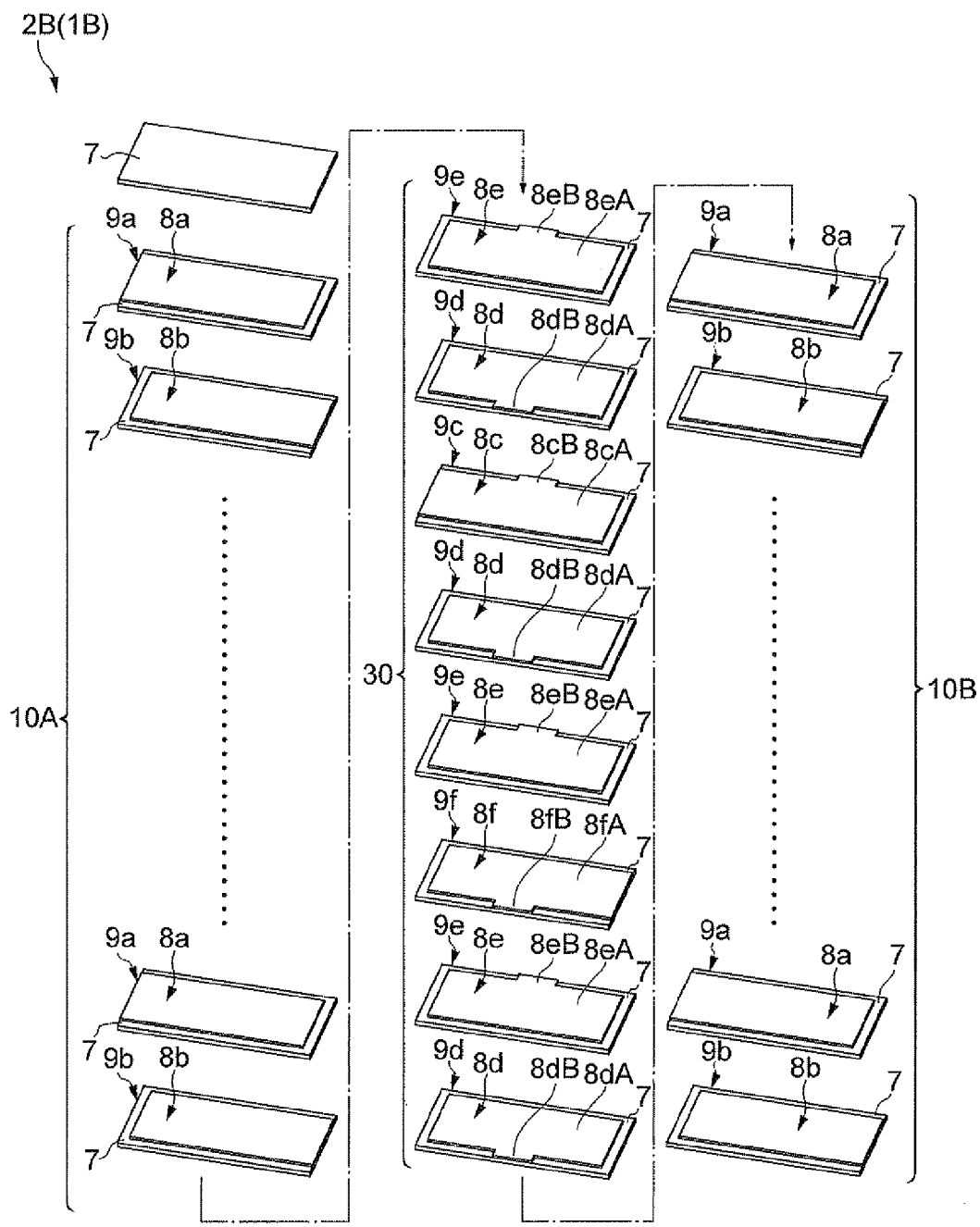
FIG. 7 is a view illustrating the layer structure of the multilayer capacitor in accordance with a third embodiment.

The third embodiment will now be explained. FIG. 7 is a view illustrating the layer structure of the multilayer capacitor in accordance with the third embodiment. As illustrated in FIG. 7, in this multilayer capacitor 1B, the composite layers 9a to 9f have a multilayer structure different from that in the first embodiment, while the outer electrodes 3, 4, connecting conductors 5, 6, and composite layers 9a to 9l are constructed as in the first embodiment.

As illustrated in FIG. 7, in the multilayer body 2B of the multilayer capacitor 1B, capacitance units 10A, 10B are arranged so as to hold an ESR control unit 30 therebetween when seen in the stacking direction. That is, the multilayer body 2B is constructed by arranging the capacitance unit 10A, ESR control unit 30, and capacitance unit 10B in this order. Each of the capacitance units 10A, 10B is constructed by alternately stacking a plurality of composite layers 9a, 9b, while their inner electrodes 8a, 8b oppose each other as different polarities through their corresponding dielectric layer 7. The number of stacked composite layers 9a, 9b, which are depicted only four each in FIG. 7, is set appropriately in conformity to the design.

The ESR control units 30 is constructed by stacking a composite layer 9e formed with an inner electrode 8e, a composite layer 9d formed with an inner electrode 8d, a composite layer 9c formed with an inner electrode 8c, a composite layer 9d formed with an inner electrode 8d, a composite layer 9e formed with an inner electrode 8e, a composite layer 9f formed with an inner electrode 8f, a composite layer 9e formed with an inner electrode 8e, and a composite layer 9d formed with an inner electrode 8d in this order. The inner electrode 8e of each composite layer 9e is connected to the outer electrode 3 through the connecting conductor 6 and inner electrode 8e and thus attains negative polarity as with the inner electrode 8c. The inner electrode 8d of each composite layer 9d is connected to the outer electrode 4 through the connecting conductor 5 and inner electrode 8f and thus attains positive polarity as with the inner electrode 8f. Hence, the inner electrodes 8c, 8e opposing the inner electrodes 8d, 8f through the dielectric layer 7 have a polarity different from that of the latter inner electrodes.

At the boundaries between the ESR control unit 30 and the capacitance units 10A, 10B, the respective inner electrodes 8b, 8e of the composite layers 9b, 9e oppose each other through the dielectric layer 7, and so do the respective inner electrodes 8d, 8a of the composite layers 9d, 9a. Specifically, the inner electrode 8b of the composite layer 9b connected to the outer electrode 4 so as to attain positive polarity and the inner electrode 8e of the composite layer 9e attaining negative polarity through the connecting conductor 6 oppose each other through the dielectric layer 7. The inner electrode 8d of the composite layer 9d attaining positive polarity through the connecting conductor 5 and the inner electrode 8a of the composite layer 9a connected to the outer electrode 3 so as to attain negative polarity oppose each other through the dielectric layer 7.

That is, the multilayer body 2B is constructed such that, at the boundaries between the ESR control unit 30 and the capacitance units 10A, 10B, the inner electrodes 8a, 8c connected to the outer electrode 3 and the inner electrodes 8b, 8f connected to the outer electrode 4 are kept from being arranged such as to have polarities different from each other through the dielectric layer 7. Specifically, at the boundaries between the ESR control unit 30 and the capacitance units 10A, 10B in the multilayer body 2B, the inner electrodes 8a, 8f are kept from opposing each other, and so are the inner electrodes 8b, 8c.

At the boundaries between the ESR control unit 30 and the capacitance units 10A, 10B, the inner electrodes 8a, 8d oppose each other, and so do the inner electrodes 8b, 8e. Hence, the multilayer capacitor 1B is constructed such that, when mounted to the substrate 100 so as to be fed with a current, no high frequency currents pass through the boundaries between the ESR control unit 30 and the capacitance units 10A, 10B, i.e., between the composite layers 9b, 9e and between the composite layers 9d, 9a.

As explained in the foregoing and as in the first embodiment, at the boundaries between the ESR control unit 30 and the capacitance units 10A, 10B in the multilayer capacitor 1B, the inner electrodes 8a, 8b of the capacitor units 10A, 10B connected to the outer electrodes 3, 4 and their corresponding inner electrodes 8c, 8f of the ESR control unit 30 connected to the outer electrodes 3, 4 are kept from being arranged such as to have polarities different from each other through the dielectric layer 7. As a consequence, no high frequency currents pass through the boundaries between the ESR control unit 30 and the capacitance units 10A, 10B, so that the capacitor components of the ESR control unit 30 and capacitance units 10A, 10B can be separated from each other without being combined, and so can their ESR components. Since the ESR component (lower ESR) in the capacitance units 10A, 10B and the ESR component (higher ESR) in the ESR control unit 30 are thus separated from each other, the ESR on the higher or lower frequency band side can be increased in the multilayer capacitor 1B. Hence, the ESR can be controlled in a wide frequency band.

Fourth Embodiment

Figure 8:
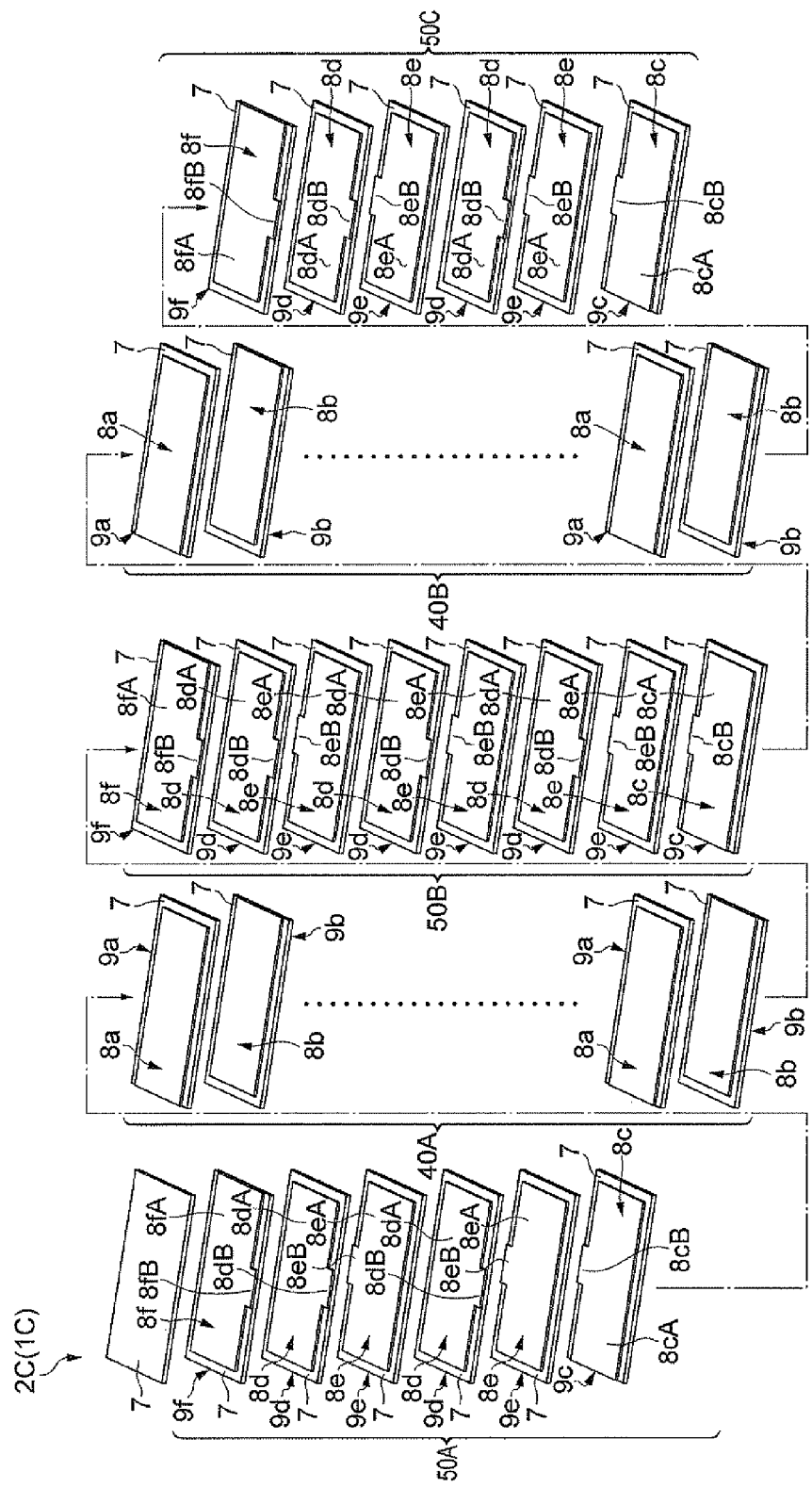
FIG. 8 is a view illustrating the layer structure of the multilayer capacitor in accordance with a fourth embodiment.

The fourth embodiment will now be explained. FIG. 8 is a view illustrating the layer structure of the multilayer capacitor in accordance with the fourth embodiment. As illustrated in FIG. 8, in this multilayer capacitor 1C, the composite layers 9a to 9f have a multilayer structure different from that in the first embodiment, while the outer electrodes 3, 4, connecting conductors 5, 6, and composite layers 9a to 9f are constructed as in the first embodiment.

As illustrated in FIG. 8, the multilayer body 2C of the multilayer capacitor 1C is constructed by arranging an ESR control unit 50A, a capacitance unit 40A, an ESR control unit 50B, a capacitance unit 40B, and an ESR control unit 50C in this order. Each of the capacitance units 40A, 40B is constructed by alternately stacking a plurality of composite layers 9a, 9b, while their inner electrodes 8a, 8b oppose each other as different polarities through their corresponding dielectric layer 7. The number of stacked composite layers 9a, 9b, which are depicted only four each in FIG. 8, is set appropriately in conformity to the design.

Each of the ESR control units 50A, 50C is constructed by stacking a composite layer 9f formed with an inner electrode 8f, a composite layer 9d formed with an inner electrode 8d, a composite layer 9e formed with an inner electrode 8e, a composite layer 9d formed with an inner electrode 8d, a composite layer 9e formed with an inner electrode 8e, and a composite layer 9c formed with an inner electrode 8c in this order. The inner electrode 8e of each composite layer 9e is connected to the outer electrode 3 through the connecting conductor 6 and inner electrode 8c and thus attains negative polarity as with the inner electrode 8c. The inner electrode 8d of each composite layer 9d is connected to the outer electrode 4 through the connecting conductor 5 and inner electrode 8f and thus attains positive polarity as with the inner electrode 8f.

The ESR control unit 50B is constructed by stacking a composite layer 9f formed with an inner electrode 8f, a composite layer 9d formed with an inner electrode 8d, a composite layer 9e formed with an inner electrode 8e, a composite layer 9d formed with an inner electrode 8d, a composite layer 9e formed with an inner electrode 8e, a composite layer 9d formed with an inner electrode 8d, a composite layer 9e formed with an inner electrode 8e, and a composite layer 9c formed with an inner electrode 8c in this order. The inner electrode 8e of each composite layer 9e is connected to the outer electrode 3 through the connecting conductor 6 and inner electrode 8c and thus attains negative polarity as with the inner electrode 8c, while the inner electrode 8d of each composite layer 9d is connected to the outer electrode 4 through the connecting conductor 5 and inner electrode 8f and thus attains positive polarity as with the inner electrode 8f.

At the boundaries between the capacitance units 40A, 40B and the ESR control units 50A to 50C, the inner electrodes 8a, 8b connected to the outer electrodes 3, 4 and the inner electrodes 8c, 8f connected to the outer electrodes 3, 4 are kept from being arranged such as to have polarities different from each other through the dielectric layer 7. In other words, the inner electrodes 8a, 8b connected to the outer electrodes 3, 4 and their corresponding inner electrodes 8c, 8f connected to the outer electrodes 3, 4 are arranged such as to have the same polarities through the dielectric layer 7.

Specifically, each of the inner electrodes 8a, 8c of the composite layers 9a, 9c connected to the outer electrode 3 attains negative polarity. Each of the inner electrodes 8b, 8f of the composite layers 9b, 9f connected to the outer electrode 4 attains positive polarity.

At the boundaries between the capacitance units 40A, 40B and the ESR control units 50A to 50C in thus constructed multilayer capacitor 1C, the inner electrodes 8a, 8c oppose each other, and so do the inner electrodes 8b, 8f. Hence, the multilayer capacitor 1C is constructed such that, when mounted to the substrate 100 so as to be fed with a current, no high frequency currents pass through the boundaries between the capacitance units 40A, 40B and the ESR control units 50A to 50C, i.e., between the composite layers 9c, 9a and between the composite layers 9b, 9f.

As explained in the foregoing and as in the first embodiment, at the boundaries between the capacitance units 40A, 40B and the ESR control units 50A to 50C in the multilayer capacitor 1C, the inner electrodes 8a, 8b of the capacitance units 40A, 40B connected to the outer electrodes 3, 4 and their corresponding inner electrodes 8c, 8f of the ESR control units 50A to 50C connected to the outer electrodes 3, 4 are kept from being arranged such as to have different polarities through the dielectric layer 7. That is, the inner electrodes 8a, 8c attaining the same polarity (negative polarity) oppose each other through the dielectric layer 7, while the inner electrodes 8b, 8f attaining the same polarity (positive polarity) oppose each other through the dielectric layer 7.

As a consequence, no high frequency currents pass through the boundaries between the capacitance units 40A, 40B and the ESR control units 50A to 50C, so that the capacitor components of the capacitance units 40A, 40B and ESR units 50A to 50C can be separated from each other without being combined, and so can their ESR components. Since the ESR component (lower ESR) in the capacitance units 40A, 40B and the ESR component (higher ESR) in the ESR control units 50A to 50C are thus separated from each other, the ESR on the higher or lower frequency band side can be increased in the multilayer capacitor 1C. Hence, the ESR can be controlled in a wide frequency band.

Fifth Embodiment

Figure 9:
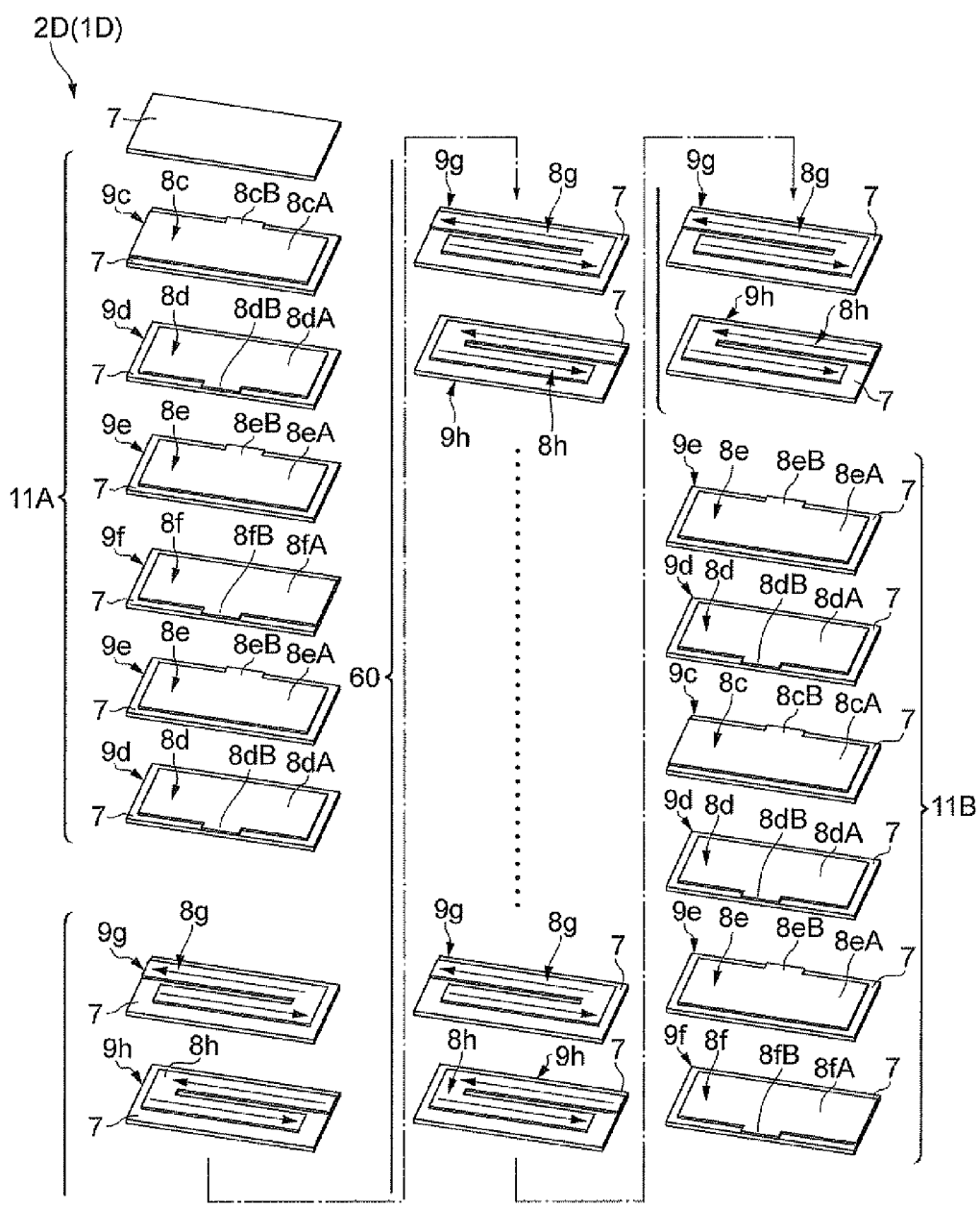
FIG. 9 is a view illustrating the layer structure of the multilayer capacitor in accordance with a fifth embodiment.

The fifth embodiment will now be explained. FIG. 9 is a view illustrating the layer structure of the multilayer capacitor in accordance with the fifth embodiment. As illustrated in FIG. 9, in this multilayer capacitor 1D, the structures of composite layers 9g, 9h constituting a capacitance unit 60 differ from those in the first embodiment, while the outer electrodes 3, 4, connecting conductors 5, 6, and composite layers 9c to 9f are constructed as in the first embodiment.

As illustrated in FIG. 9, in the multilayer body 2D of the multilayer capacitor 1D, a pair of ESR control units 11A, 11B are arranged so as to hold the capacitance unit 60 therebetween when seen in the stacking direction. That is, the multilayer body 2D is constructed by arranging the ESR control unit 11A, capacitance unit 60, and ESR control unit 11B in this order. The ESR control units 11A, 11B are constituted as in the first embodiment.

The capacitance unit 60 is constructed by alternately stacking a plurality of two kinds of composite layers 9g, 9h having respective inner electrodes. The composite layer 9g has an inner electrode 8g formed on the dielectric layer 7. The inner electrode 8g has a substantially U-shape (winding form), while an end portion thereof is exposed at the end face 2a of the multilayer body 2D, so as to connect with the outer electrode 3. The inner electrode 8g attains negative polarity.

The composite layer 9h has an inner electrode 8h formed on the dielectric layer 7. The inner electrode 8h has a substantially U-shape, while an end portion thereof is exposed at the end face 2b of the multilayer body 2D, so as to connect with the outer electrode 4. The inner electrode 8h attains positive polarity. In the capacitance unit 60, the inner electrodes 8g, 8h oppose each other as different polarities through the dielectric layer 7. The number of stacked composite layers 9g, 9h, which are depicted only four each in FIG. 9, is set appropriately in conformity to the design.

At the boundaries between the capacitance unit 60 and the ESR control units 11A, 11B in the multilayer body 2D, the respective inner electrodes 8d, 8g of the composite layers 9d, 9g oppose each other, and so do the respective inner electrodes 8h, 8e of the composite layers 9h, 9e. Specifically, the inner electrode 8d of the composite layer 9d attaining positive polarity through the connecting conductor 5 and the inner electrode 8g of the composite layer 9g connected to the outer electrode 3 so as to attain negative polarity oppose each other through the dielectric layer 7. The inner electrode 8h of the composite layer 9h connected to the outer electrode 4 so as to attain positive polarity and the inner electrode 8e of the composite layer 9e attaining negative polarity through the connecting conductor 6 oppose each other through the dielectric layer 7. That is, the multilayer body 2D is constructed such that, at the boundaries between the capacitance unit 60 and the ESR control units 11A, 11B, the inner electrodes 8c, 8g connected to the outer electrode 3 are kept from being arranged such as to have polarities different from each other through the dielectric layer 7, and so are the inner electrodes 8f, 8h connected to the outer electrodes 4.

When thus constructed multilayer capacitor 1D is mounted to the substrate 100, currents flow in the same directions (directions of arrows in FIG. 9) in the inner electrodes 8g, 8h of the composite layers 9g, 9h in the capacitance unit 60. Therefore, ESL can be enhanced by the mutual inductance between the inner electrodes 8g, 8h opposing each other through the dielectric layer 7. FIG. 10 is a chart illustrating impedance characteristics of the multilayer capacitor represented in FIG. 9. In FIG. 10(a), the solid line represents the impedance characteristic of the ESR control units 11A, 11B, the dash-single-dot line the impedance characteristic when the ESL in the capacitance unit 60 is higher (the self-resonant frequency is on the lower frequency side), and the dotted line the impedance characteristic when the ESL in the capacitance unit 60 is lower (the self-resonant frequency is on the higher frequency side). FIG. 10(b) represents the total impedance (the combined impedance of the impedance of the capacitance unit 60 and the impedance of the ESR control units 11A, 11B) when the ESL in the capacitance unit 60 is lower. FIG. 10(c) represents the total impedance when the ESL in the capacitance unit 60 is higher.

When each of the inner electrodes 8g, 8h of the capacitance unit 60 has a substantially U-shape (a form in which a rectangular electrode is provided with a slit) as illustrated in FIG. 9, the capacitance unit 60 increases its ESL, so that the resonance frequency caused by the capacitance unit 60 shifts to the lower frequency side as illustrated in FIG. 10(a). Therefore, when the capacitance C0 of the capacitance unit 60 is sufficiently greater than the capacitance C1 of the ESR control units 11A, 11B (C0>>C1), the total impedance can be made flat and lower over a wide band as illustrated in FIG. 10(c).

As explained in the foregoing and as in the first embodiment, at the boundaries between the capacitance unit 60 and the ESR control units 11A, 11B in the multilayer capacitor 1D, the inner electrodes 8g, 8h of the capacitance unit 60 connected to the outer electrodes 3, 4 and their corresponding inner electrodes 8c, 8f of the ESR control units 11A, 11B connected to the outer electrodes 3, 4 are kept from being arranged such as to have different polarities through the dielectric layer 7. As a consequence, no high frequency currents pass through the boundaries between the capacitance unit 60 and the ESR control units 11A, 11B, so that the capacitor components of the capacitance unit 60 and ESR units 11A, 11B can be separated from each other without being combined, and so can their ESR components. Since the ESR component (lower ESR) in the capacitance unit 60 and the ESR component (higher ESR) in the ESR control units 11A, 11B are thus separated from each other, the ESR on the higher or lower frequency band side can be increased in the multilayer capacitor 1D. Hence, the ESR can be controlled in a wide frequency band.

Figure 11:
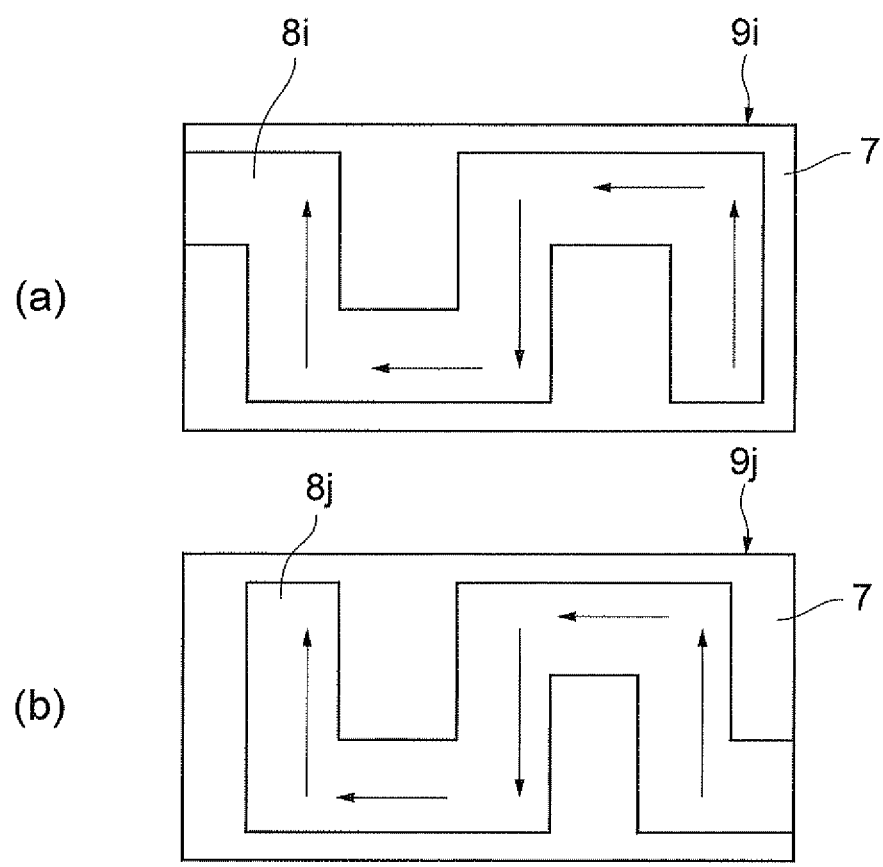
FIG. 11 is a view illustrating an inner electrode.

The inner electrodes may also be constructed as illustrated in FIG. 11. As illustrated in FIG. 11, an inner electrode 8i of a composite layer 9i exhibits a substantially S-form. An end portion of the inner electrode 8i is exposed at the end face 2a of the multilayer body 2, so as to connect with the outer electrode 3. An inner electrode 8j of a composite layer 9j exhibits a substantially S-form. An end portion of the inner electrode 8j is exposed at the end face 2b of the multilayer body 2, so as to connect with the outer electrode 4. As in the inner electrodes 8g, 8h, currents flow in the same direction (direction of arrows in FIG. 11) in the respective inner electrodes 8i, 8j of the composite layers 9i, 9j opposing each other, whereby the ESL can also be enhanced by the mutual inductance between the inner electrodes 8i, 8j in such a structure.

Sixth Embodiment

Figure 12:
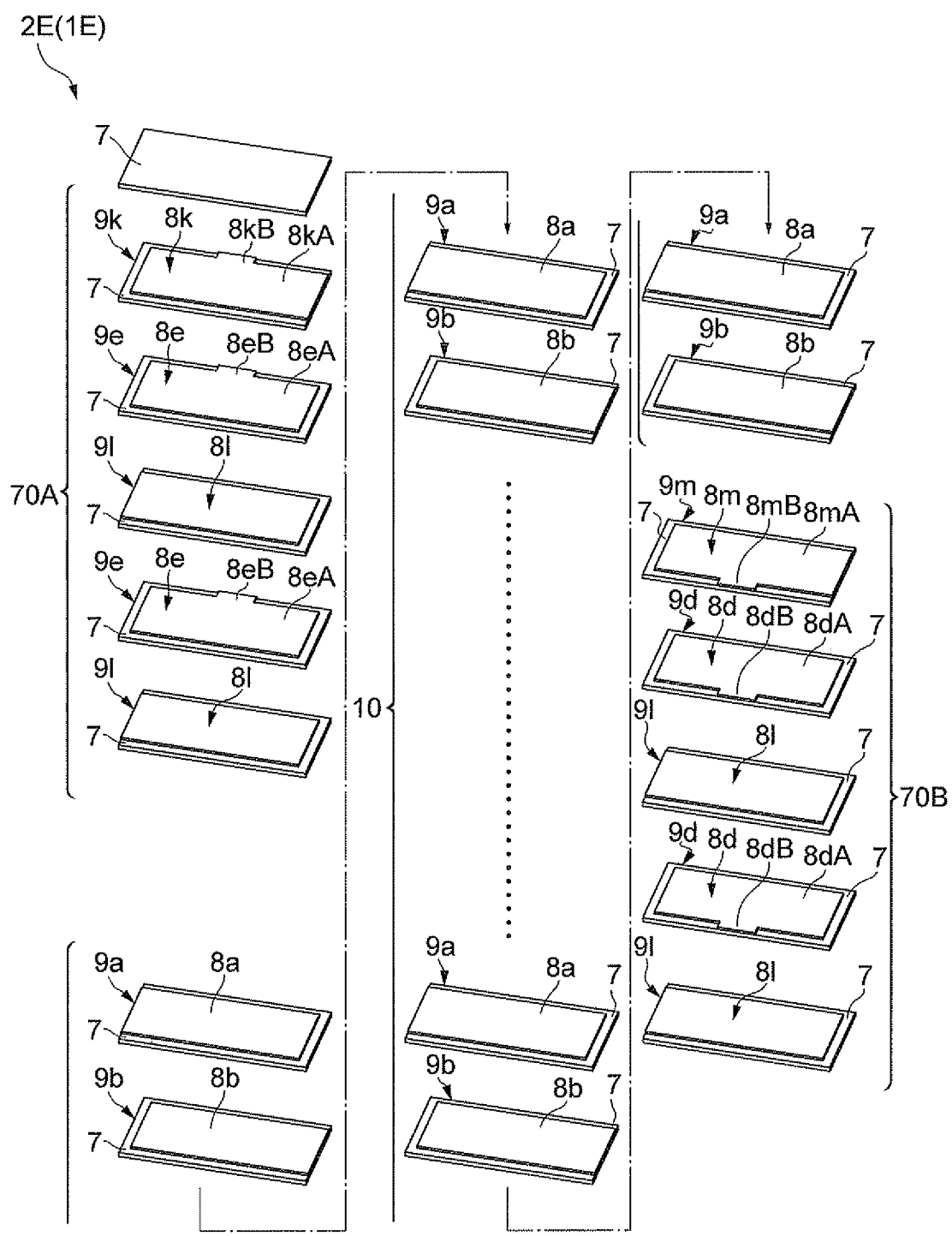
FIG. 12 is a view illustrating the layer structure of the multilayer capacitor in accordance with a sixth embodiment.

The sixth embodiment will now be explained. FIG. 12 is a view illustrating the layer structure of the multilayer capacitor in accordance with the sixth embodiment. As illustrated in FIG. 12, in this multilayer capacitor 1E, the structures of composite layers 9k, 9l, 9m constituting ESR control units 70A, 70B differ from those in the first embodiment, while the outer electrodes 3, 4, connecting conductors 5, 6, and composite layers 9a, 9b, 9d, 9e are constructed as in the first embodiment.

As illustrated in FIG. 12, the multilayer body 2E of the multilayer capacitor 1E is constructed by stacking an ESR control unit 70A, a capacitance unit 10, and an ESR control unit 70B in this order. The capacitance unit 10 is constituted by alternately stacking a plurality of composite layers 9a, 9b, while their inner electrodes 8a, 8b oppose each other as different polarities through their corresponding dielectric layer 7. The number of stacked composite layers 9a, 9b, which are depicted only four each in FIG. 12, is set appropriately in conformity to the design.

The ESR control unit 70A is constructed by stacking three kinds of composite layers 9e, 9k, 9l having respective inner electrodes. The composite layer 9k has an inner electrode (fourth inner electrode) 8k formed on the dielectric layer 7. The inner electrode 8k has a rectangular main electrode part 8kA formed at a center portion and a band-like lead conductor 8kB drawn from a side of the main electrode part 8kA. An end portion of the main electrode part 8kA is exposed at the end face 2b of the multilayer body 2E, so as to connect with the outer electrode 4. An end portion of the lead conductor 8kB is exposed at the side face 2d of the multilayer body 2E, so as to connect with the connecting conductor 6. The inner electrode 8k attains positive polarity.

The composite layer 9l has an inner electrode (third inner electrode) 8l formed on the dielectric layer 7. The inner electrode 8l has a rectangular form, while an end portion thereof is exposed at the end face 2a of the multilayer body 2E, so as to connect with the outer electrode 3. The inner electrode 8l attains negative polarity.

The ESR control unit 70B is constructed by stacking three kinds of composite layers 9d, 9l, 9m having respective inner electrodes. The composite layer 9m has an inner electrode (fourth inner electrode) 8m formed on the dielectric layer 7. The inner electrode 8m has a rectangular main electrode part 8mA formed at a center portion and a band-like lead conductor 8mB drawn from a side of the main electrode part 8mA. An end portion of the main electrode part 8mA is exposed at the end face 2b of the multilayer body 2E, so as to connect with the outer electrode 4. An end portion of the lead conductor 8mB is exposed at the side face 2c of the multilayer body 2E, so as to connect with the connecting conductor 5. The inner electrode 8m attains positive polarity.

The ESR control unit 70A is constructed by stacking the composite layer 9k formed with the inner electrode 8k, the composite layer 9e formed with the inner electrode 8e, the composite layer 9l formed with the inner electrode 8l, the composite layer 9e formed with the inner electrode 8e, and the composite layer 9l formed with the inner electrode 8l in this order. The inner electrode 8e of each composite layer 9e is connected to the outer electrode 4 through the connecting conductor 6 and inner electrode 8k and thus attains positive polarity as with the inner electrode 8k.

The ESR control unit 70B is constructed by stacking the composite layer 9m formed with the inner electrode 8m, the composite layer 9d formed with the inner electrode 8d, the composite layer 9l formed with the inner electrode 8l, the composite layer 9d formed with the inner electrode 8d, and the composite layer 9l formed with the inner electrode 8l in this order. The inner electrode 8d of each composite layer 9d is connected to the outer electrode 4 through the connecting conductor 5 and inner electrode 8m and thus attains positive polarity as with the inner electrode 8m.

At the boundaries between the capacitance unit 10 and the ESR control units 70A, 70B in the multilayer body 2E, the respective inner electrodes 8l, 8a of the composite layers 9l, 9a oppose each other, and so do the respective inner electrodes 8b, 8m of the composite layers 9b, 9m. Specifically, the inner electrode 8l of the composite layer 9l connected to the outer electrode 3 so as to attain negative polarity and the inner electrode 8a of the composite layer 9a connected to the outer electrode 3 so as to attain negative polarity oppose each other through the dielectric layer 7. The inner electrode 8b of the composite layer 9b connected to the outer electrode 4 so as to attain positive polarity and the inner electrode 8m of the composite layer 9m connected to the outer electrode 4 so as to attain positive polarity oppose each other through the dielectric layer 7. That is, at the boundaries between the capacitance unit 10 and the ESR control units 70A, 70B in the multilayer body 2E, the electrodes 8a, 8l connected to the outer electrode 3 are arranged such as to have the same polarity through the dielectric layer 7, and so are the inner electrodes 8b, 8m connected to the outer electrode 4.

As explained in the foregoing and as in the first embodiment, at the boundaries between the capacitance unit 10 and the ESR control units 70A, 70B in the multilayer capacitor 1E, the inner electrodes 8a, 8b of the capacitance unit 10 connected to the outer electrodes 3, 4 and their corresponding inner electrodes 8k, 8l, 8m of the ESR control units 70A, 70B connected to the outer electrodes 3, 4 are kept from being arranged such as to have different polarities through the dielectric layer 7. That is, the inner electrodes 8a, 8l attaining the same polarity (negative polarity) oppose each other through the dielectric layer 7, and so do the inner electrodes 8b, 8m attaining the same polarity (positive polarity).

As a consequence, no high frequency currents pass through the boundaries between the capacitance unit 10 and the ESR control units 70A, 70B, so that the capacitor components of the capacitance unit 10 and ESR units 70A, 70B can be separated from each other without being combined, and so can their ESR components. Since the ESR component (lower ESR) in the capacitance unit 10 and the ESR component (higher ESR) in the ESR control units 70A, 70B are thus separated from each other, the ESR on the higher or lower frequency band side can be increased in the multilayer capacitor 1E. Hence, the ESR can be controlled in a wide frequency band.

Seventh Embodiment

Figure 13:
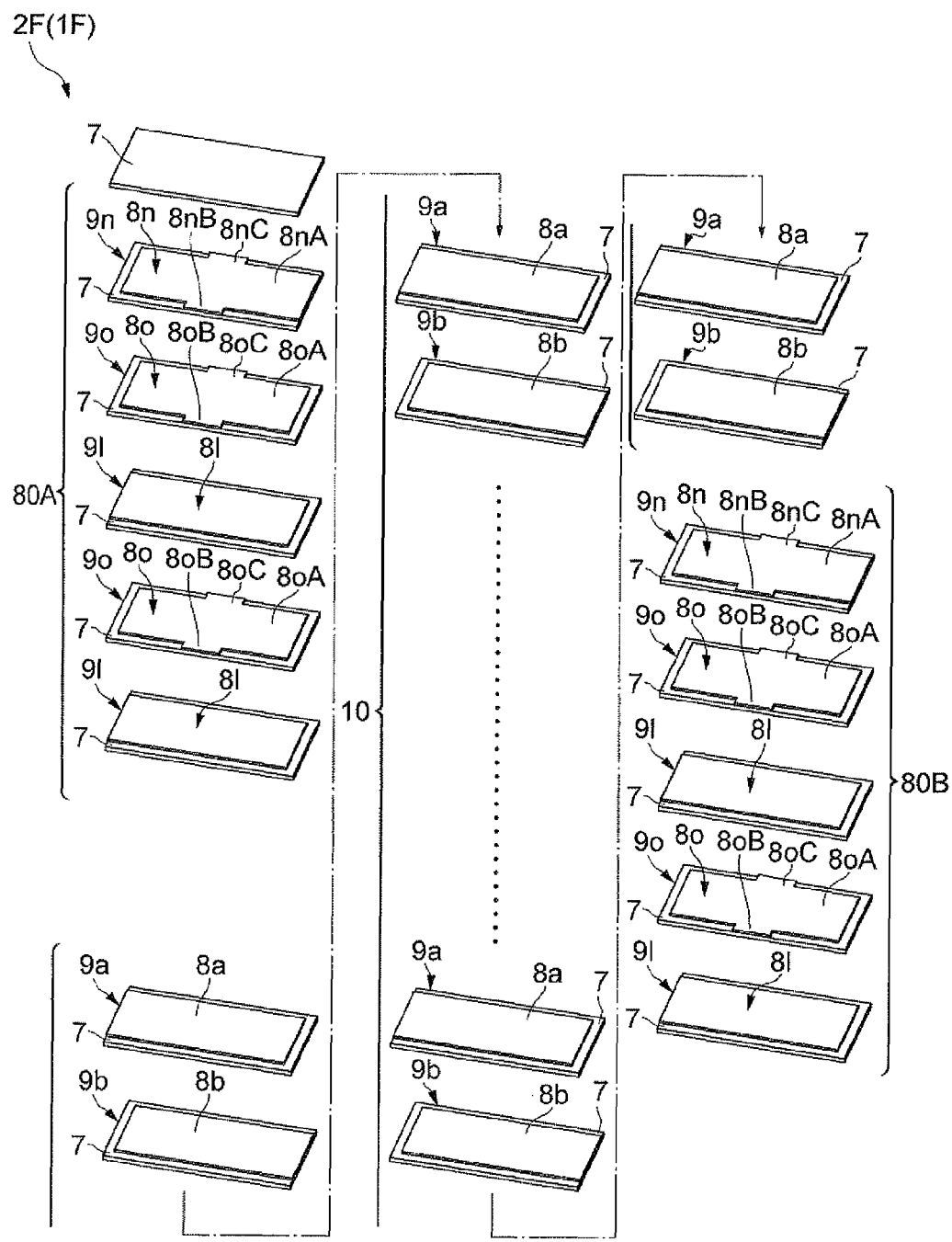
FIG. 13 is a view illustrating the layer structure of the multilayer capacitor in accordance with a seventh embodiment.

The seventh embodiment will now be explained. FIG. 13 is a view illustrating the layer structure of the multilayer capacitor in accordance with the seventh embodiment. As illustrated in FIG. 13, in this multilayer capacitor 1F, the structures of composite layers 9n, 9o constituting ESR control units 80A, 80B differ from those in the sixth embodiment, while the outer electrodes 3, 4, connecting conductors 5, 6, and composite layers 9a, 9b, 9l are constructed as in the sixth embodiment.

As illustrated in FIG. 13, the multilayer body 2F of the multilayer capacitor 1F is constructed by stacking an ESR control unit 80A, a capacitance unit 10, and an ESR control unit 80B in this order. The capacitance unit 10 is constituted by alternately stacking a plurality of composite layers 9a, 9b, while their inner electrodes 8a, 8b oppose each other as different polarities through their corresponding dielectric layer 7. The number of stacked composite layers 9a, 9b, which are depicted only four each in FIG. 13, is set appropriately in conformity to the design.

Each of the ESR control units 80A, 80B is constructed by stacking three kinds of composite layers 9l, 9n, 9o having respective inner electrodes. The composite layer 9n has an inner electrode (fourth inner electrode) 8n formed on the dielectric layer 7. The inner electrode 8n has a rectangular main electrode part 8nA formed at a center portion, a band-like lead conductor 8nB drawn from one side of the main electrode part 8nA, and a band-like lead conductor 8nC drawn from another side of the main electrode part 8nA. An end portion of the main electrode part 8nA is exposed at the end face 2b of the multilayer body 2, so as to connect with the outer electrode 4. An end portion of the lead conductor 8nB is exposed at the side face 2c of the multilayer body 2, so as to connect with the connecting conductor 5. An end portion of the lead conductor 8nC is exposed at the side face 2d of the multilayer body 2 in the direction opposite to the lead conductor 8nB, so as to connect with the connecting conductor 6. The inner electrode 8n attains positive polarity.

The composite layer 9o has an inner electrode (fifth inner electrode) 8o formed on the dielectric layer 7. The inner electrode 8o has a rectangular main electrode part 8oA formed at a center portion, a band-like lead conductor 8oB drawn from one side of the main electrode part 8oA, and a band-like lead conductor 8oC drawn from another side of the main electrode part 8oA. An end portion of the lead conductor 8oB is exposed at the side face 2c of the multilayer body 2, so as to connect with the connecting conductor 5. An end portion of the lead conductor 8oC is exposed at the side face 2d of the multilayer body 2 in the direction opposite to the lead conductor 8oB, so as to connect with the connecting conductor 6. The inner electrode 8o attains positive polarity.

At the boundaries between the capacitance unit 10 and the ESR control units 80A, 80B in the multilayer body 2F, the respective inner electrodes 8l, 8a of the composite layers 9l, 9a oppose each other, and so do the respective inner electrodes 8b, 8n of the composite layers 9b, 9n. Specifically, the inner electrode 8l of the composite layer 9l connected to the outer electrode 3 so as to attain negative polarity and the inner electrode 8a of the composite layer 9a connected to the outer electrode 3 so as to attain negative polarity oppose each other through the dielectric layer 7. The inner electrode 8b of the composite layer 9b connected to the outer electrode 4 so as to attain positive polarity and the inner electrode 8n of the composite layer 9n connected to the outer electrode 4 so as to attain positive polarity oppose each other through the dielectric layer 7. That is, at the boundaries between the capacitance unit 10 and the ESR control units 80A, 80B in the multilayer body 2F, the electrodes 8a, 8l connected to the outer electrode 3 are arranged such as to have the same polarity through the dielectric layer 7, and so are the inner electrodes 8b, 8n connected to the outer electrode 4.

As explained in the foregoing and as in the first embodiment, at the boundaries between the capacitance unit 10 and the ESR control units 80A, 80B in the multilayer capacitor 1F, the inner electrodes 8a, 8b of the capacitance unit 10 connected to the outer electrodes 3, 4 and their corresponding inner electrodes 8l, 8n of the ESR control units 80A, 80B connected to the outer electrodes 3, 4 are kept from being arranged such as to have different polarities through the dielectric layer 7. That is, the inner electrodes 8a, 8l attaining the same polarity (negative polarity) oppose each other through the dielectric layer 7, and so do the inner electrodes 8b, 8n attaining the same polarity (positive polarity).

As a consequence, no high frequency currents pass through the boundaries between the capacitance unit 10 and the ESR control units 80A, 80B, so that the capacitor components of the capacitance unit 10 and ESR units 80A, 80B can be separated from each other without being combined, and so can their ESR components. Since the ESR component (lower ESR) in the capacitance unit 10 and the ESR component (higher ESR) in the ESR control units 80A, 80B are thus separated from each other, the ESR on the higher or lower frequency band side can be increased in the multilayer capacitor 1F. Hence, the ESR can be controlled in a wide frequency band.

Figure 14:
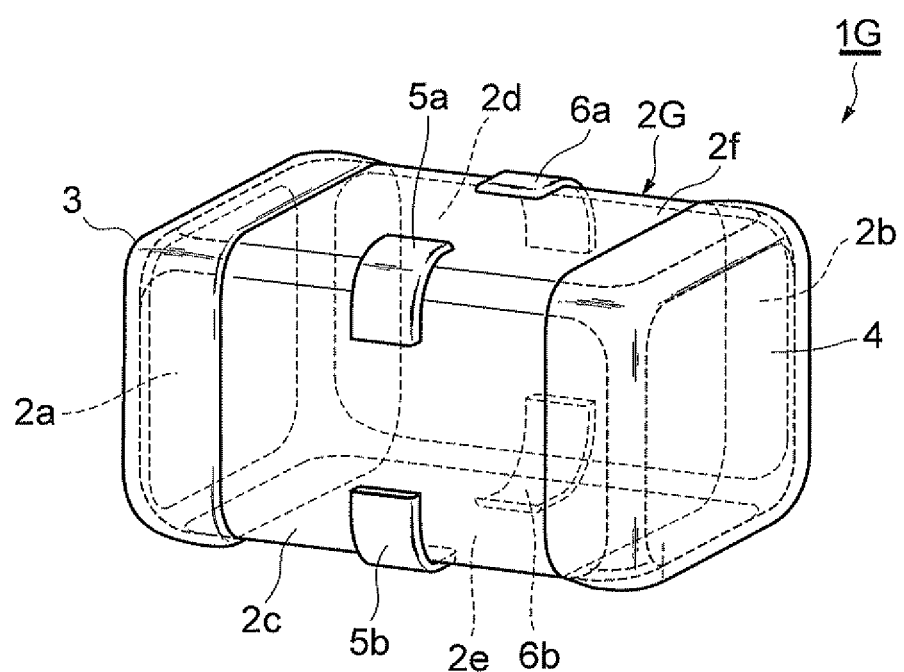
FIG. 14 is a perspective view illustrating the multilayer capacitor in another mode.
Figure 15:
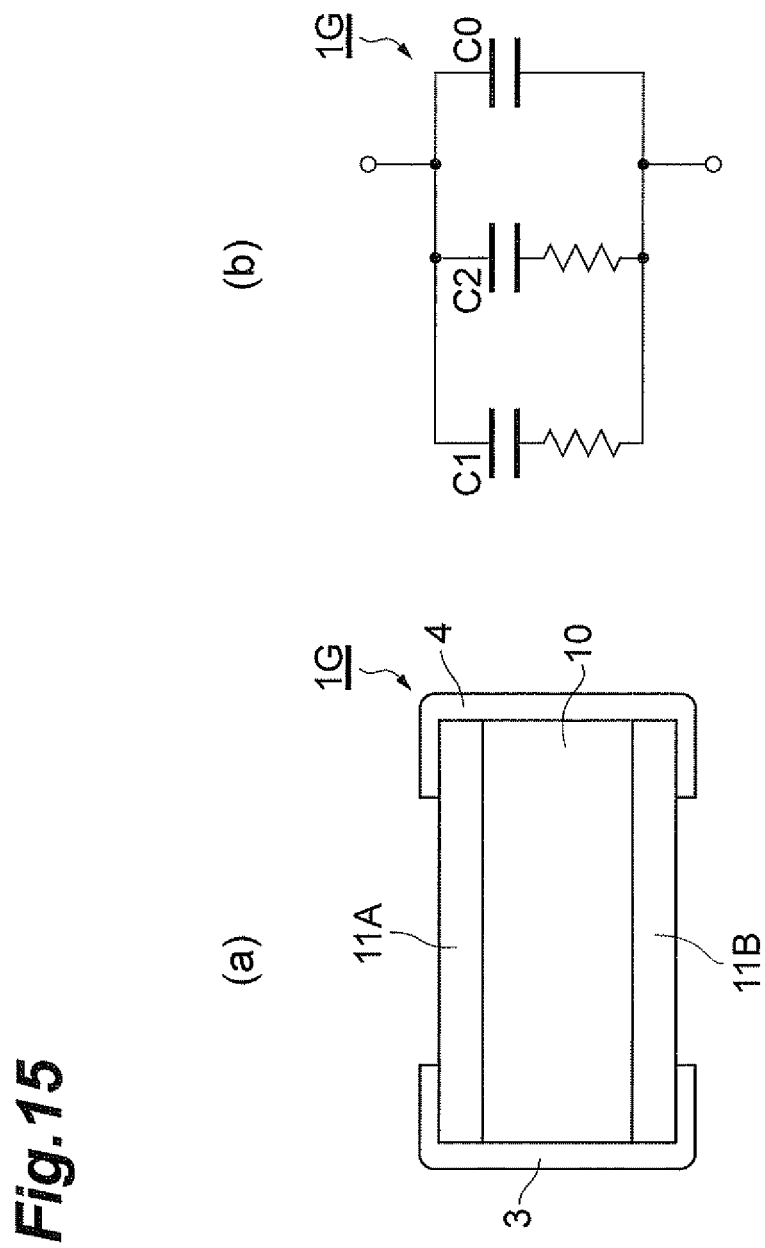
FIG. 15 is a diagram illustrating the circuit of the multilayer capacitor represented in FIG. 14.

The present invention is not limited to the above-mentioned embodiments. For example, the connecting conductors in the first and second embodiments may be shaped as illustrated in FIG. 14. Specifically, a multilayer body 2G of a multilayer capacitor 1G is formed with connecting conductors 5a, 5b, 6a, 6b as illustrated in FIG. 14. The connecting conductors 5a, 5b, 6a, 6b are formed at positions corresponding to the lead conductors 8cB to 8fB in the inner electrodes 8c to 8f of the composite layers 9c to 9f while being separated from each other at two locations in the stacking direction. Such a structure separates the respective capacitor components (C0, C1, C2) of the capacitance unit 10 and ESR control units 11A, 11B in the multilayer capacitor 1G illustrated in FIG. 15(a). Hence, the multilayer capacitor 1G is constructed as a circuit illustrated in FIG. 15(b).

Figure 16:
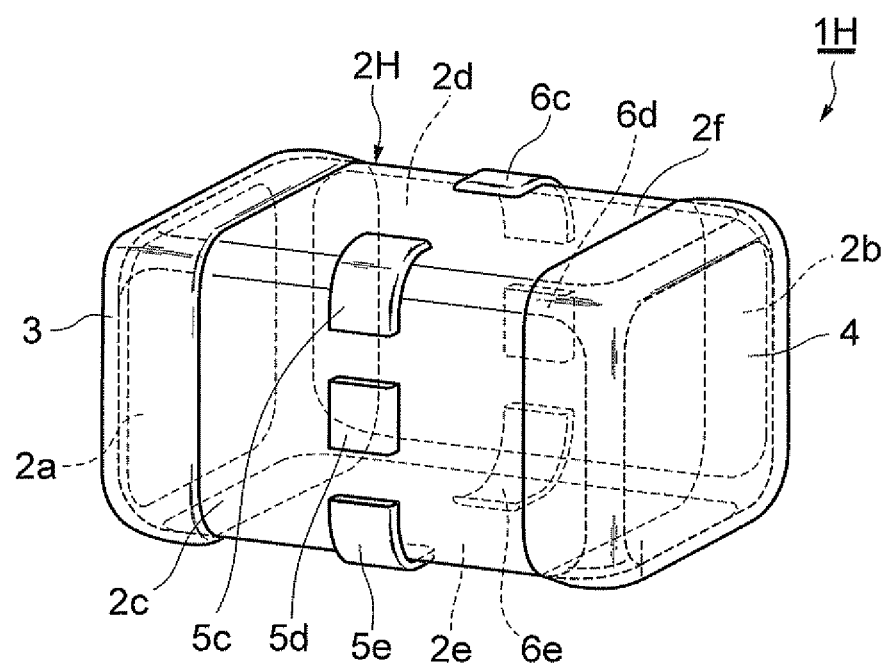
FIG. 16 is a perspective view illustrating the multilayer capacitor in still another mode.

The connecting conductors in the fourth embodiment may be shaped as illustrated in FIG. 16. Specifically, a multilayer body 2H of a multilayer capacitor 1H is foamed with connecting conductors 5c to 5e, 6c to 6e as illustrated in FIG. 16. The connecting conductors 5c to 5e, 6c to 6e are formed at positions corresponding to the lead conductors 8cB to 8fB in the inner electrodes 8c to 8f of the composite layers 9c to 9f while being separated from each other at three locations in the stacking direction. Such a structure separates the respective capacitor components (C0, C1, C2, C3) of the capacitance units 40A, 40B and ESR control units 50A to 50C in the multilayer capacitor 1H illustrated in FIG. 17(a). Hence, the multilayer capacitor 1H is constructed as a circuit illustrated in FIG. 17(b).

The forms of the inner electrodes 8g to 8j may also be employed in the inner electrodes constituting the capacitance units in the first to fourth, sixth, and seventh embodiments.

While the outer electrodes 3, 4 attain negative and positive polarities, respectively, in the above-mentioned embodiments, their polarities may be reversed.

The forms of the inner electrodes 8a to 8f are not limited to those mentioned above. The output electrodes 3, 4 may be formed on the side faces 2c, 2d of the multilayer depending on the forms of inner electrodes. The layer structures of ESR control units are not limited to those described in the above-mentioned embodiments, whereby the number of stacked composite layers and the like can be changed as appropriate according to the design of capacitors.

1, 1A to 1H . . . multilayer capacitor; 2, 2A to 2F . . . multilayer body; 3, 4 . . . outer electrode; 5, 6 . . . connecting conductor; 8a, 8g, 8i . . . inner electrode (first inner electrode); 8b, 8h, 8j . . . inner electrode (second inner electrode); 8c, 8l . . . inner electrode (third inner electrode); 8d . . . inner electrode (sixth inner electrode); 8e . . . inner electrode (fifth inner electrode); 8f, 8k, 8m, 8n . . . inner electrode (fourth inner electrode); 10, 10A, 10B, 40A, 40B, 60 . . . capacitance unit; 11A, 11B, 20A, 20B, 30, 50A to 50C, 70A, 70B, 80A, 80B . . . ESR control unit; C0 . . . capacitance of the capacitance unit; C1 . . . capacitance of the ESR control unit; W0 . . . gap between the capacitance unit and ESR control unit; W1 . . . gap between inner electrodes in the capacitance unit and ESR unit

What is claimed is:

1. A multilayer capacitor comprising:
a multilayer body including a plurality of inner electrodes stacked while interposing a dielectric layer therebetween;
first and second outer electrodes formed on an outer surface of the multilayer body; and
a first connecting conductor formed on the outer surface of the multilayer body;
wherein the plurality of inner electrodes include first to fifth inner electrodes;
wherein the multilayer body has:
a capacitance unit having the first and second inner electrodes connected to the first and second outer electrodes, respectively, the first and second inner electrodes opposing each other as different polarities through the dielectric layer, and
an ESR control unit having the third inner electrode connected to at least the first outer electrode, the fourth inner electrode connected to at least the second outer electrode and first connecting conductor, and the fifth inner electrode connected to at least the first connecting conductor, at least two of the third to fifth inner electrodes opposing each other as different polarities through the dielectric layer; and
wherein the first or second inner electrode of the capacitance unit and the third or fourth inner electrode of the ESR control unit are kept from opposing each other as different polarities through the dielectric layer at a boundary between the capacitance unit and the ESR control unit.

2. A multilayer capacitor according to claim 1, wherein, in the ESR control unit, the third and fourth inner electrodes are kept from opposing each other as different polarities through the dielectric layer.

3. A multilayer capacitor according to claim 1, further comprising a second connecting conductor formed on the outer surface of the multilayer body;
wherein the third inner electrode is connected to the first outer electrode and the second connecting conductor.

4. A multilayer capacitor according to claim 3, wherein the plurality of inner electrodes further include a sixth inner electrode;
wherein the ESR control unit has the sixth inner electrode connected to the second connecting conductor;
wherein the first and third inner electrodes have a first polarity; and
wherein the second and fourth inner electrodes have a second polarity.

5. A multilayer capacitor according to claim 4, wherein, at the boundary between the capacitance unit and the ESR control unit,
the first and fourth inner electrodes are kept from opposing each other through the dielectric layer, the first inner electrode and one of the third, fifth, and sixth inner electrodes oppose each other through the dielectric layer, the second and third inner electrodes are kept from opposing each other through the dielectric layer, and the second inner electrode and one of the fourth to sixth inner electrodes oppose each other through the dielectric layer.

6. A multilayer capacitor according to claim 4, wherein, in the ESR control unit, the third and fourth inner electrodes are kept from opposing each other through the dielectric layer, the fourth inner electrode and the fifth or sixth inner electrode oppose each other through the dielectric layer, the third inner electrode and the fifth or sixth inner electrode oppose each other through the dielectric layer, and the fifth and sixth inner electrodes oppose each other through the dielectric layer.

7. A multilayer capacitor according to claim 4, wherein, in the ESR control unit, the fourth and sixth inner electrodes are kept from opposing each other through the dielectric layer, the fourth and fifth inner electrodes oppose each other through the dielectric layer, the third and fourth inner electrodes are kept from opposing each other through the dielectric layer, and the third and sixth inner electrodes oppose each other through the dielectric layer.

8. A multilayer capacitor according to claim 3, wherein, at the boundary between the capacitance unit and the ESR control unit, the first and sixth inner electrodes oppose each other through the dielectric layer, and the second and fifth inner electrodes oppose each other through the dielectric layer.

9. A multilayer capacitor according to claim 1, further comprising a second connecting conductor formed on the outer surface of the multilayer body, wherein the fourth inner electrode is connected to the second outer electrode and the first and second connecting conductors; and wherein the fifth inner electrode is connected to the first and second connecting conductors.

10. A multilayer capacitor according to claim 9, wherein, in the ESR control unit, the third and fourth inner electrodes are kept from opposing each other through the dielectric layer, the fourth and fifth inner electrodes oppose each other through the dielectric layer, and the third and fifth inner electrodes oppose each other through the dielectric layer.

11. A multilayer capacitor according to one of claim 1, wherein, in the multilayer body, the capacitance unit and the ESR control unit are arranged alternately in the stacking direction of the dielectric layer.

12. A multilayer capacitor according to one of claim 1, wherein, in the multilayer body, the ESR control unit is arranged at an outermost part in the stacking direction.

13. A multilayer capacitor according to claim 12, wherein, in the ESR control unit, the third or fourth inner electrode is arranged at an outermost part in the stacking direction.

14. A multilayer capacitor according to one of claim 1, wherein the ESR control unit has a capacitance lower than that of the capacitance unit.

15. A multilayer capacitor according to one of claim 1, wherein the ESR control unit has a capacitance higher than that of the capacitance unit.

16. A multilayer capacitor according to one of claim 1, wherein the capacitance unit and the ESR control unit have a gap therebetween greater than that between the inner electrodes in the capacitance unit or ESR control unit.

17. A multilayer capacitor according to one of claim 1, wherein the first and second inner electrodes have a winding form, while a current flows therethrough in the same direction.

18. A multilayer capacitor according to one of claim 3, wherein a plurality of the first and second connecting conductors are formed so as to be separated from each other in the stacking direction at a position corresponding to a lead conductor of the inner electrode.

19. A multilayer capacitor comprising:

a multilayer body including a plurality of inner electrodes stacked while interposing a dielectric layer therebetween;

first and second outer electrodes formed on an outer surface of the multilayer body; and a first connecting conductor formed on the outer surface of the multilayer body;

wherein the plurality of inner electrodes include first to fifth inner electrodes;

wherein the multilayer body has:

a capacitance unit having the first and second inner electrodes connected to the first and second outer electrodes, respectively, the first and second inner electrodes opposing each other as different polarities through the dielectric layer, and an ESR control unit having the third inner electrode connected to at least the first outer electrode, the fourth inner electrode connected to at least the second outer electrode and first connecting conductor, and the fifth inner electrode connected to at least the first connecting conductor, at least two of the third to fifth inner electrodes opposing each other as different polarities through the dielectric layer;

wherein, at a boundary between the capacitance unit and the ESR control unit, the first or second inner electrode of the capacitance unit and the third or fourth inner electrode of the ESR control unit oppose each other as the same polarity through the dielectric layer, or the first or second inner electrode of the capacitance unit and the fifth inner electrode of the ESR control unit oppose each other through the dielectric layer.

20. A multilayer capacitor according to claim 19, wherein, at the boundary between the capacitance unit and the ESR control unit, the second inner electrode of the capacitance unit and the fifth inner electrode of the ESR control unit oppose each other through the dielectric layer.

21. A multilayer capacitor according to claim 19, wherein, in the ESR control unit, the third and fifth inner electrodes oppose each other as different polarities through the dielectric layer, or the fourth and fifth inner electrodes oppose each other as the same polarity through the dielectric layer.

22. A multilayer capacitor according to claim 19, further comprising a second connecting conductor formed on the outer surface of the multilayer body;

wherein the third inner electrode is connected to the first outer electrode and second connecting conductor.

23. A multilayer capacitor according to claim 19, further comprising a second connecting conductor formed on the outer surface of the multilayer body;

wherein the fourth inner electrode is connected to the second outer electrode and first and second connecting conductors; and wherein the fifth inner electrode is connected to the first and second connecting conductors.

* * * * *